(12) United States Patent
Coleman et al.

(10) Patent No.: US 11,941,635 B1
(45) Date of Patent: *Mar. 26, 2024

(54) SYSTEM AND ARCHITECTURE FOR ELECTRONIC FRAUD DETECTION

(71) Applicant: Experian Information Solutions, Inc., Costa Mesa, CA (US)

(72) Inventors: Neli Coleman, Alexandria, VA (US); Lloyd Laudorn, Ladera Ranch, CA (US); Raymond Martin Boileau, Bowie, MD (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,789

(22) Filed: Jul. 25, 2022

Related U.S. Application Data

(63) Continuation of application No. 17/208,327, filed on Mar. 22, 2021, now Pat. No. 11,436,606, which is a
(Continued)

(51) Int. Cl.
- *G06Q 40/00* (2023.01)
- *G06Q 20/40* (2012.01)
- *G06Q 40/12* (2023.01)

(52) U.S. Cl.
CPC ....... *G06Q 20/4016* (2013.01); *G06Q 40/123* (2013.12)

(58) Field of Classification Search
CPC ... G06Q 40/00; G06Q 20/4016; G06Q 40/123
See application file for complete search history.

(56) References Cited

U.S. PATENT DOCUMENTS

| 2,074,513 A | 3/1937 | Mills |
| 3,316,395 A | 4/1967 | Lavin et al. |

(Continued)

FOREIGN PATENT DOCUMENTS

| AU | 2022291564 | 7/2023 |
| CA | 3 058 653 | 4/2020 |

(Continued)

OTHER PUBLICATIONS

Tax aggressiveness and accounting fraud C Lennox, P Lisowsky, J Pittman—Journal of Accounting . . . , 2013—Wiley Online Library (Year: 2013).*

(Continued)

*Primary Examiner* — Lalita M Hamilton
(74) *Attorney, Agent, or Firm* — Knobbe Martens Olson & Bear LLP

(57) ABSTRACT

Embodiments of an electronic fraud analysis platform system are disclosed which may be used to analyze tax returns for potential fraud. Analysis of tax return data using the tax return analysis platform computing systems and methods discussed herein may provide insight into whether a tax return may be fraudulent based on, for example, an initial screening component configured to filter tax returns which appear fraudulent due to missing or inaccurate information provided with the return; a device activity analysis component configured to identify whether a device used to submit a tax return or to provide further authentication information needed to complete processing of the return may have been used in other fraudulent activities; and a knowledge-based authentication component configured to identify potential fraudsters using dynamically generated questions for which fraudsters typically do not know the answers.

20 Claims, 6 Drawing Sheets

Related U.S. Application Data continuation of application No. 16/443,662, filed on Jun. 17, 2019, now Pat. No. 10,990,979, which is a continuation of application No. 14/928,770, filed on Oct. 30, 2015, now Pat. No. 10,339,527.

(60) Provisional application No. 62/073,714, filed on Oct. 31, 2014.

(56) References Cited

U.S. PATENT DOCUMENTS

| | | |
|---|---|---|
| 3,752,904 A | 8/1973 | Waterbury |
| 4,163,290 A | 7/1979 | Sutherlin et al. |
| 5,274,547 A | 12/1993 | Zoffel et al. |
| 5,323,315 A | 6/1994 | Highbloom |
| 5,386,104 A | 1/1995 | Sime |
| 5,414,833 A | 5/1995 | Hershey et al. |
| 5,454,030 A | 9/1995 | de Oliveira et al. |
| 5,504,675 A | 4/1996 | Cragun et al. |
| 5,563,783 A | 10/1996 | Stolfo et al. |
| 5,627,886 A | 5/1997 | Bowman |
| 5,679,940 A | 10/1997 | Templeton et al. |
| 5,696,907 A | 12/1997 | Tom |
| 5,696,965 A | 12/1997 | Dedrick |
| 5,739,512 A | 4/1998 | Tognazzini |
| 5,742,775 A | 4/1998 | King |
| 5,745,654 A | 4/1998 | Titan |
| 5,752,242 A | 5/1998 | Havens |
| 5,754,632 A | 5/1998 | Smith |
| 5,774,868 A | 6/1998 | Cragun et al. |
| 5,793,497 A | 8/1998 | Funk |
| 5,809,478 A | 9/1998 | Greco et al. |
| 5,819,226 A | 10/1998 | Gopinathan et al. |
| 5,819,260 A | 10/1998 | Lu et al. |
| 5,822,741 A | 10/1998 | Fischthal |
| 5,832,068 A | 11/1998 | Smith |
| 5,842,178 A | 11/1998 | Giovannoli |
| 5,870,721 A | 2/1999 | Norris |
| 5,872,921 A | 2/1999 | Zahariev et al. |
| 5,878,403 A | 3/1999 | DeFrancesco |
| 5,879,297 A | 3/1999 | Haynor et al. |
| 5,884,289 A | 3/1999 | Anderson et al. |
| 5,912,839 A | 6/1999 | Ovshinsky et al. |
| 5,913,196 A | 6/1999 | Talmor et al. |
| 5,943,666 A | 8/1999 | Kleewein et al. |
| 5,950,179 A | 9/1999 | Buchanan et al. |
| 5,987,440 A | 11/1999 | O'Neil et al. |
| 5,999,907 A | 12/1999 | Donner |
| 5,999,940 A | 12/1999 | Ranger |
| 6,023,694 A | 2/2000 | Kouchi et al. |
| 6,029,139 A | 2/2000 | Cunningham et al. |
| 6,029,149 A | 2/2000 | Dykstra et al. |
| 6,029,154 A | 2/2000 | Pettitt |
| 6,029,194 A | 2/2000 | Tilt |
| 6,044,357 A | 3/2000 | Garg |
| 6,055,570 A | 4/2000 | Nielsen |
| 6,094,643 A | 7/2000 | Anderson et al. |
| 6,119,103 A | 9/2000 | Basch et al. |
| 6,125,985 A | 10/2000 | Amdahl et al. |
| 6,142,283 A | 11/2000 | Amdahl et al. |
| 6,144,988 A | 11/2000 | Kappel |
| 6,157,707 A | 12/2000 | Baulier et al. |
| 6,182,219 B1 | 1/2001 | Feldbau et al. |
| 6,208,720 B1 | 3/2001 | Curtis et al. |
| 6,249,228 B1 | 6/2001 | Shirk et al. |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,349 B1 | 7/2001 | Aieta et al. |
| 6,282,658 B2 | 8/2001 | French et al. |
| 6,285,983 B1 | 9/2001 | Jenkins |
| 6,285,987 B1 | 9/2001 | Roth et al. |
| 6,292,795 B1 | 9/2001 | Peters et al. |
| 6,311,169 B2 | 10/2001 | Duhon |
| 6,317,783 B1 | 11/2001 | Freishtat et al. |
| 6,321,339 B1 | 11/2001 | French et al. |
| 6,330,546 B1 | 12/2001 | Gopinathan et al. |
| 6,397,197 B1 | 5/2002 | Gindlesperger |
| 6,418,436 B1 | 7/2002 | Degen et al. |
| 6,424,956 B1 | 7/2002 | Werbos |
| 6,448,889 B1 | 9/2002 | Hudson |
| 6,456,984 B1 | 9/2002 | Demoff et al. |
| 6,496,936 B1 | 12/2002 | French et al. |
| 6,505,193 B1 | 1/2003 | Musgrave et al. |
| 6,510,415 B1 | 1/2003 | Talmor et al. |
| 6,513,018 B1 | 1/2003 | Culhane |
| 6,532,459 B1 | 3/2003 | Berson |
| 6,542,894 B1 | 4/2003 | Lee et al. |
| 6,543,683 B2 | 4/2003 | Hoffman |
| 6,553,495 B1 | 4/2003 | Johansson et al. |
| 6,571,334 B1 | 5/2003 | Feldbau et al. |
| 6,597,775 B2 | 7/2003 | Lawyer et al. |
| 6,612,488 B2 | 9/2003 | Suzuki |
| 6,615,193 B1 | 9/2003 | Kingdon et al. |
| 6,658,393 B1 | 12/2003 | Basch et al. |
| 6,662,023 B1 | 12/2003 | Helle |
| 6,696,941 B2 | 2/2004 | Baker |
| 6,700,220 B2 | 3/2004 | Bayeur et al. |
| 6,714,918 B2 | 3/2004 | Hillmer et al. |
| 6,735,572 B2 | 5/2004 | Landesmann |
| 6,740,875 B1 | 5/2004 | Ishikawa et al. |
| 6,748,426 B1 | 6/2004 | Shaffer et al. |
| 6,751,626 B2 | 6/2004 | Brown et al. |
| 6,796,497 B2 | 9/2004 | Benkert et al. |
| 6,811,082 B2 | 11/2004 | Wong |
| 6,829,711 B1 | 12/2004 | Kwok et al. |
| 6,850,606 B2 | 2/2005 | Lawyer et al. |
| 6,857,073 B2 | 2/2005 | French et al. |
| 6,866,586 B2 | 3/2005 | Oberberger et al. |
| 6,871,287 B1 | 3/2005 | Ellingson |
| 6,873,979 B2 | 3/2005 | Fishman et al. |
| 6,898,574 B1 | 5/2005 | Regan |
| 6,907,408 B2 | 6/2005 | Angel |
| 6,908,030 B2 | 6/2005 | Rajasekaran et al. |
| 6,913,194 B2 | 7/2005 | Suzuki |
| 6,918,038 B1 | 7/2005 | Smith et al. |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,934,858 B2 | 8/2005 | Woodhill |
| 6,965,881 B1 | 11/2005 | Brickell et al. |
| 6,965,997 B2 | 11/2005 | Dutta |
| 6,973,462 B2 | 12/2005 | Dattero et al. |
| 6,973,575 B2 | 12/2005 | Arnold |
| 6,983,381 B2 | 1/2006 | Jerdonek |
| 6,983,882 B2 | 1/2006 | Cassone |
| 6,991,174 B2 | 1/2006 | Zuili |
| 6,993,659 B2 | 1/2006 | Milgramm et al. |
| 7,007,174 B2 | 2/2006 | Wheeler et al. |
| 7,028,052 B2 | 4/2006 | Chapman et al. |
| 7,035,855 B1 | 4/2006 | Kilger et al. |
| 7,069,240 B2 | 6/2006 | Spero et al. |
| 7,083,090 B2 | 8/2006 | Zuili |
| 7,089,592 B2 | 8/2006 | Adjaoute et al. |
| 7,092,891 B2 | 8/2006 | Maus et al. |
| 7,104,444 B2 | 9/2006 | Suzuki |
| 7,158,622 B2 | 1/2007 | Lawyer et al. |
| 7,162,640 B2 | 1/2007 | Heath et al. |
| 7,174,335 B2 | 2/2007 | Kameda |
| 7,188,078 B2 | 3/2007 | Arnett et al. |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,240,059 B2 | 7/2007 | Bayliss et al. |
| 7,240,363 B1 | 7/2007 | Ellingson |
| 7,246,067 B2 | 7/2007 | Austin et al. |
| 7,246,740 B2 | 7/2007 | Swift et al. |
| 7,254,560 B2 | 8/2007 | Singhal |
| 7,263,506 B2 | 8/2007 | Lee et al. |
| 7,272,728 B2 | 9/2007 | Pierson et al. |
| 7,272,857 B1 | 9/2007 | Everhart |

(56) References Cited

U.S. PATENT DOCUMENTS

| | | |
|---|---|---|
| 7,277,869 B2 | 10/2007 | Starkman |
| 7,277,875 B2 | 10/2007 | Serrano-Morales et al. |
| 7,283,974 B2 | 10/2007 | Katz et al. |
| 7,289,607 B2 | 10/2007 | Bhargava et al. |
| 7,290,704 B1 | 11/2007 | Ball et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,314,167 B1 | 1/2008 | Kiliccote |
| 7,330,871 B2 | 2/2008 | Barber |
| 7,333,635 B2 | 2/2008 | Tsantes et al. |
| 7,340,042 B2 | 3/2008 | Cluff et al. |
| 7,343,149 B2 | 3/2008 | Benco |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,376,618 B1 | 5/2008 | Anderson et al. |
| 7,383,227 B2 | 6/2008 | Weinflash et al. |
| 7,386,448 B1 | 6/2008 | Poss et al. |
| 7,386,506 B2 | 6/2008 | Aoki et al. |
| 7,392,534 B2 | 6/2008 | Lu et al. |
| 7,395,273 B2 | 7/2008 | Khan et al. |
| 7,398,915 B1 | 7/2008 | Pineda-Sanchez et al. |
| 7,406,715 B2 | 7/2008 | Clapper |
| 7,412,228 B2 | 8/2008 | Barclay et al. |
| 7,418,431 B1 | 8/2008 | Nies et al. |
| 7,428,509 B2 | 9/2008 | Klebanoff |
| 7,433,855 B2 | 10/2008 | Gavan et al. |
| 7,433,864 B2 | 10/2008 | Malik |
| 7,438,226 B2 | 10/2008 | Helsper et al. |
| 7,444,518 B1 | 10/2008 | Dharmarajan et al. |
| 7,457,401 B2 | 11/2008 | Lawyer et al. |
| 7,458,508 B1 | 12/2008 | Shao et al. |
| 7,466,235 B1 | 12/2008 | Kolb et al. |
| 7,467,401 B2 | 12/2008 | Cicchitto |
| 7,480,631 B1 | 1/2009 | Merced et al. |
| 7,481,363 B2 | 1/2009 | Zuili |
| 7,490,052 B2 | 2/2009 | Kilger et al. |
| 7,490,356 B2 | 2/2009 | Lieblich et al. |
| 7,497,374 B2 | 3/2009 | Helsper et al. |
| 7,509,117 B2 | 3/2009 | Yum |
| 7,512,221 B2 | 3/2009 | Toms |
| 7,519,558 B2 | 4/2009 | Ballard et al. |
| 7,522,060 B1 | 4/2009 | Tumperi et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,739 B2 | 6/2009 | Brown et al. |
| 7,543,740 B2 | 6/2009 | Greene et al. |
| 7,546,271 B1 | 6/2009 | Chmielewski et al. |
| 7,548,886 B2 | 6/2009 | Kirkland et al. |
| 7,552,467 B2 | 6/2009 | Lindsay |
| 7,562,184 B2 | 7/2009 | Henmi et al. |
| 7,562,814 B1 | 7/2009 | Shao et al. |
| 7,568,616 B2 | 8/2009 | Zuili |
| 7,575,157 B2 | 8/2009 | Barnhardt et al. |
| 7,580,884 B2 | 8/2009 | Cook |
| 7,581,112 B2 | 8/2009 | Brown et al. |
| 7,584,146 B1 | 9/2009 | Duhon |
| 7,587,368 B2 | 9/2009 | Felsher |
| 7,591,425 B1 | 9/2009 | Zuili et al. |
| 7,593,891 B2 | 9/2009 | Kornegay et al. |
| 7,606,401 B2 | 10/2009 | Hoffman et al. |
| 7,606,790 B2 | 10/2009 | Levy |
| 7,610,216 B1 | 10/2009 | May et al. |
| 7,610,229 B1 | 10/2009 | Kornegay |
| 7,610,243 B2 | 10/2009 | Haggerty et al. |
| 7,620,596 B2 | 11/2009 | Knudson et al. |
| 7,623,844 B2 | 11/2009 | Herrmann et al. |
| 7,630,924 B1 | 12/2009 | Collins et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,769 B2 | 2/2010 | Baker et al. |
| 7,668,840 B2 | 2/2010 | Bayliss et al. |
| 7,668,921 B2 | 2/2010 | Proux et al. |
| 7,672,865 B2 | 3/2010 | Kumar et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,689,505 B2 | 3/2010 | Kasower |
| 7,689,506 B2 | 3/2010 | Fei et al. |
| 7,690,032 B1 | 3/2010 | Peirce |
| 7,701,364 B1 | 4/2010 | Zilberman |
| 7,702,550 B2 | 4/2010 | Perg et al. |
| 7,707,163 B2 | 4/2010 | Anzalone et al. |
| 7,708,190 B2 | 5/2010 | Brandt et al. |
| 7,708,200 B2 | 5/2010 | Helsper et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,734,523 B1 | 6/2010 | Cui et al. |
| 7,735,125 B1 | 6/2010 | Alvarez et al. |
| 7,742,982 B2 | 6/2010 | Chaudhuri et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,084 B2 | 7/2010 | Pettitt |
| 7,752,236 B2 | 7/2010 | Williams et al. |
| 7,752,554 B2 | 7/2010 | Biggs et al. |
| 7,756,783 B2 | 7/2010 | Crooks |
| 7,761,379 B2 | 7/2010 | Zoldi et al. |
| 7,761,384 B2 | 7/2010 | Madhogarhia |
| 7,774,270 B1 | 8/2010 | MacCloskey |
| 7,778,885 B1 | 8/2010 | Semprevivo et al. |
| 7,779,456 B2 | 8/2010 | Dennis et al. |
| 7,779,457 B2 | 8/2010 | Taylor |
| 7,783,281 B1 | 8/2010 | Cook et al. |
| 7,783,515 B1 | 8/2010 | Kumar et al. |
| 7,788,184 B2 | 8/2010 | Kane |
| 7,792,715 B1 | 9/2010 | Kasower |
| 7,792,864 B1 | 9/2010 | Rice et al. |
| 7,793,835 B1 | 9/2010 | Coggeshall et al. |
| 7,801,811 B1 | 9/2010 | Merrell et al. |
| 7,801,828 B2 | 9/2010 | Candella et al. |
| 7,802,104 B2 | 9/2010 | Dickinson |
| 7,805,362 B1 | 9/2010 | Merrell et al. |
| 7,805,391 B2 | 9/2010 | Friedlander et al. |
| 7,809,797 B2 | 10/2010 | Cooley et al. |
| 7,813,944 B1 | 10/2010 | Luk et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,840,459 B1 | 11/2010 | Loftesness et al. |
| 7,841,004 B1 | 11/2010 | Balducci et al. |
| 7,844,520 B1 | 11/2010 | Franklin |
| 7,848,987 B2 | 12/2010 | Haig |
| 7,849,029 B2 | 12/2010 | Crooks et al. |
| 7,853,518 B2 | 12/2010 | Cagan |
| 7,853,526 B2 | 12/2010 | Milana |
| 7,853,533 B2 | 12/2010 | Eisen |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,769 B2 | 12/2010 | Benson |
| 7,860,783 B2 | 12/2010 | Yang et al. |
| 7,865,427 B2 | 1/2011 | Wright et al. |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,873,382 B2 | 1/2011 | Rydgren et al. |
| 7,873,566 B1 | 1/2011 | Templeton et al. |
| 7,874,488 B2 | 1/2011 | Parkinson |
| 7,877,304 B1 | 1/2011 | Coulter |

(56) References Cited

U.S. PATENT DOCUMENTS

| | | |
|---|---|---|
| 7,877,784 B2 | 1/2011 | Chow et al. |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens et al. |
| 7,933,835 B2 | 4/2011 | Keane et al. |
| 7,941,363 B2 | 5/2011 | Tanaka et al. |
| 7,945,515 B2 | 5/2011 | Zoldi et al. |
| 7,950,577 B1 | 5/2011 | Daniel |
| 7,958,046 B2 | 6/2011 | Doerner et al. |
| 7,961,857 B2 | 6/2011 | Zoldi et al. |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,970,701 B2 | 6/2011 | Lewis et al. |
| 7,971,246 B1 | 6/2011 | Emigh et al. |
| 7,975,299 B1 | 7/2011 | Balducci et al. |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,991,751 B2 | 8/2011 | Peled et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,263 B2 | 9/2011 | Zarikian et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,073,785 B1 | 12/2011 | Candella et al. |
| 8,078,569 B2 | 12/2011 | Kennel |
| 8,090,648 B2 | 1/2012 | Zoldi et al. |
| 8,104,679 B2 | 1/2012 | Brown |
| 8,116,731 B2 | 2/2012 | Buhrmann et al. |
| 8,121,962 B2 | 2/2012 | Vaiciulis et al. |
| 8,131,615 B2 | 3/2012 | Diev et al. |
| 8,151,327 B2 | 4/2012 | Eisen |
| 8,195,549 B2 | 6/2012 | Kasower |
| 8,201,257 B1 | 6/2012 | Andres et al. |
| 8,204,774 B2 | 6/2012 | Chwast et al. |
| 8,204,982 B2 | 6/2012 | Casado et al. |
| 8,214,262 B1 | 7/2012 | Semprivivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,239,677 B2 | 8/2012 | Colson |
| 8,244,629 B2 | 8/2012 | Lewis et al. |
| 8,255,978 B2 | 8/2012 | Dick |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,613 B1 | 10/2012 | Coulter |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,463,904 B2 | 6/2013 | Casado et al. |
| 8,468,090 B2 | 6/2013 | Lesandro et al. |
| 8,489,479 B2 | 7/2013 | Slater et al. |
| 8,510,329 B2 | 8/2013 | Balkir et al. |
| 8,515,844 B2 | 8/2013 | Kasower |
| 8,516,439 B2 | 8/2013 | Brass et al. |
| 8,543,499 B2 | 9/2013 | Haggerty et al. |
| 8,548,137 B2 | 10/2013 | Zoldi et al. |
| 8,548,903 B2 | 10/2013 | Becker |
| 8,549,590 B1 | 10/2013 | de Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,626,671 B2 | 1/2014 | Federgreen |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,684 B2 | 3/2014 | Newman et al. |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,707,445 B2 | 4/2014 | Sher-Jan et al. |
| 8,725,613 B1 | 5/2014 | Celka et al. |
| 8,763,133 B2 | 6/2014 | Sher-Jan et al. |
| 8,776,225 B2 | 7/2014 | Pierson et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,862,514 B2 | 10/2014 | Eisen |
| 8,862,526 B2 | 10/2014 | Miltonberger |
| 8,909,664 B2 | 12/2014 | Hopkins |
| 8,918,891 B2 | 12/2014 | Coggeshall et al. |
| 8,949,981 B1 | 2/2015 | Trollope et al. |
| 9,118,646 B2 | 8/2015 | Pierson et al. |
| 9,147,117 B1 | 9/2015 | Madhu et al. |
| 9,191,403 B2 | 11/2015 | Zoldi et al. |
| 9,194,899 B2 | 11/2015 | Zoldi et al. |
| 9,196,004 B2 | 11/2015 | Eisen |
| 9,210,156 B1 | 12/2015 | Little et al. |

(56) References Cited

U.S. PATENT DOCUMENTS

| | | |
|---|---|---|
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,483,650 B2 | 11/2016 | Sher-Jan et al. |
| 9,489,497 B2 | 11/2016 | MaGill et al. |
| 9,531,738 B2 | 12/2016 | Zoldi et al. |
| 9,558,368 B2 | 1/2017 | Gottschalk, Jr. et al. |
| 9,595,066 B2 | 3/2017 | Samler et al. |
| 9,600,845 B2 | 3/2017 | Nordyke et al. |
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,760,885 B1 | 9/2017 | Ramalingam et al. |
| 9,773,227 B2 | 9/2017 | Zoldi et al. |
| 9,781,147 B2 | 10/2017 | Sher-Jan et al. |
| 9,805,216 B2 | 10/2017 | Kraska et al. |
| 9,953,321 B2 | 4/2018 | Zoldi et al. |
| 10,043,213 B2 | 8/2018 | Straub et al. |
| 10,089,411 B2 | 10/2018 | Kassa |
| 10,089,679 B2 | 10/2018 | Eisen |
| 10,089,686 B2 | 10/2018 | Straub et al. |
| 10,102,530 B2 | 10/2018 | Zoldi et al. |
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 | 7/2019 | Coleman et al. |
| 10,373,061 B2 | 8/2019 | Kennel et al. |
| 10,404,472 B2 | 9/2019 | Knopf |
| 10,430,604 B2 | 10/2019 | Spinelli et al. |
| 10,438,308 B2 | 10/2019 | Prichard et al. |
| 10,482,542 B1 | 11/2019 | Jain |
| 10,497,034 B2 | 12/2019 | Yang et al. |
| 10,510,025 B2 | 12/2019 | Zoldi et al. |
| 10,521,857 B1 | 12/2019 | Shao et al. |
| 10,528,948 B2 | 1/2020 | Zoldi et al. |
| 10,579,938 B2 | 3/2020 | Zoldi et al. |
| 10,592,982 B2 | 3/2020 | Samler et al. |
| 10,593,004 B2 | 3/2020 | Gottschalk, Jr. et al. |
| 10,616,196 B1 | 4/2020 | Khitrenovich et al. |
| 10,692,058 B2 | 6/2020 | Zoldi et al. |
| 10,699,028 B1 | 6/2020 | Kennedy et al. |
| 10,713,711 B2 | 7/2020 | Zoldi |
| 10,769,290 B2 | 9/2020 | Crawford et al. |
| 10,791,136 B2 | 9/2020 | Zoldi et al. |
| 10,896,381 B2 | 1/2021 | Zoldi et al. |
| 10,896,472 B1 | 1/2021 | Stack et al. |
| 10,902,426 B2 | 1/2021 | Zoldi et al. |
| 10,909,617 B2 | 2/2021 | Kasower |
| 10,958,725 B2 | 3/2021 | Knopf |
| 10,977,363 B2 | 4/2021 | Leitner et al. |
| 10,990,979 B1 | 4/2021 | Coleman et al. |
| 10,999,298 B2 | 5/2021 | Eisen |
| 11,023,963 B2 | 6/2021 | Zoldi et al. |
| 11,025,428 B2 | 6/2021 | Knopf |
| 11,030,562 B1 | 6/2021 | Dean et al. |
| 11,037,229 B2 | 6/2021 | Zoldi et al. |
| 11,080,740 B2 | 8/2021 | Billman et al. |
| 11,087,334 B1 | 8/2021 | McEachern et al. |
| 11,093,845 B2 | 8/2021 | Zoldi et al. |
| 11,093,988 B2 | 8/2021 | Zoldi et al. |
| 11,100,506 B2 | 8/2021 | Zoldi et al. |
| 11,108,562 B2 | 8/2021 | Knopf et al. |
| 11,151,468 B1 | 10/2021 | Chen et al. |
| 11,157,650 B1 | 10/2021 | Kennedy et al. |
| 11,256,825 B2 | 2/2022 | Spinelli et al. |
| 11,354,670 B2 | 6/2022 | Phelan et al. |
| 11,367,074 B2 | 6/2022 | Zoldi et al. |
| 11,373,190 B2 | 6/2022 | Zoldi et al. |
| 11,380,171 B2 | 7/2022 | Chen et al. |
| 11,423,414 B2 | 8/2022 | Zoldi et al. |
| 11,431,736 B2 | 8/2022 | Brown et al. |
| 11,436,606 B1 | 9/2022 | Coleman et al. |
| 11,552,901 B2 | 1/2023 | Hoover et al. |
| 11,568,348 B1 | 1/2023 | Dean et al. |
| 11,580,259 B1 | 2/2023 | Kennedy et al. |
| 11,593,476 B2 | 2/2023 | Van Dyke |
| 11,625,730 B2 | 4/2023 | Liu et al. |
| 11,658,994 B2 | 5/2023 | Johnston et al. |
| 11,665,004 B2 | 5/2023 | Knopf |
| 11,669,894 B2 | 6/2023 | Nordyke et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0039523 A1 | 11/2001 | Iwamoto |
| 2002/0010684 A1 | 1/2002 | Moskowitz |
| 2002/0013899 A1 | 1/2002 | Faul |
| 2002/0019804 A1 | 2/2002 | Sutton |
| 2002/0019938 A1 | 2/2002 | Aarons |
| 2002/0032635 A1 | 3/2002 | Harris et al. |
| 2002/0040344 A1 | 4/2002 | Preiser et al. |
| 2002/0042879 A1 | 4/2002 | Gould et al. |
| 2002/0052841 A1 | 5/2002 | Guthrie et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0099649 A1 | 7/2002 | Lee et al. |
| 2002/0119824 A1 | 8/2002 | Allen |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2003/0004879 A1 | 1/2003 | Demoff et al. |
| 2003/0009426 A1 | 1/2003 | Ruiz-Sanchez |
| 2003/0018549 A1 | 1/2003 | Fei et al. |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Durfield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0233278 A1 | 12/2003 | Marshall |

(56) References Cited

U.S. PATENT DOCUMENTS

| | | |
|---|---|---|
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |
| 2004/0054619 A1 | 3/2004 | Watson et al. |
| 2004/0059653 A1 | 3/2004 | Verkuylen et al. |
| 2004/0064401 A1 | 4/2004 | Palaghita et al. |
| 2004/0078324 A1 | 4/2004 | Lonnberg et al. |
| 2004/0103147 A1 | 5/2004 | Flesher et al. |
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153656 A1 | 8/2004 | Cluts et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0204948 A1 | 10/2004 | Singletary et al. |
| 2004/0205008 A1 | 10/2004 | Haynie et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0005168 A1 | 1/2005 | Dick |
| 2005/0010513 A1 | 1/2005 | Duckworth et al. |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0027983 A1 | 2/2005 | Klawon |
| 2005/0038726 A1 | 2/2005 | Salomon et al. |
| 2005/0038737 A1 | 2/2005 | Norris |
| 2005/0039086 A1 | 2/2005 | Krishnamurthy et al. |
| 2005/0050577 A1 | 3/2005 | Westbrook et al. |
| 2005/0058262 A1 | 3/2005 | Timmins et al. |
| 2005/0065874 A1 | 3/2005 | Lefner et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |
| 2005/0125226 A1 | 6/2005 | Magee |
| 2005/0125686 A1 | 6/2005 | Brandt |
| 2005/0138391 A1 | 6/2005 | Mandalia et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |
| 2005/0242173 A1 | 11/2005 | Suzuki |
| 2005/0251474 A1 | 11/2005 | Shinn et al. |
| 2005/0256809 A1 | 11/2005 | Sadri |
| 2005/0262014 A1 | 11/2005 | Fickes |
| 2005/0273333 A1 | 12/2005 | Morin et al. |
| 2005/0273442 A1 | 12/2005 | Bennett et al. |
| 2005/0278542 A1 | 12/2005 | Pierson et al. |
| 2005/0279827 A1 | 12/2005 | Mascavage et al. |
| 2005/0279869 A1 | 12/2005 | Barklage |
| 2006/0004663 A1 | 1/2006 | Singhal |
| 2006/0014129 A1 | 1/2006 | Coleman et al. |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0161435 A1 | 7/2006 | Atef et al. |
| 2006/0161592 A1 | 7/2006 | Ertoz et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland, IV |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0288090 A1 | 12/2006 | Kraft |

(56) References Cited

U.S. PATENT DOCUMENTS

| | | |
|---|---|---|
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0038483 A1 | 2/2007 | Wood |
| 2007/0038568 A1 | 2/2007 | Greene et al. |
| 2007/0040017 A1 | 2/2007 | Kozlay |
| 2007/0040019 A1 | 2/2007 | Berghel et al. |
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100774 A1 | 5/2007 | Abdon |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0155411 A1 | 7/2007 | Morrison |
| 2007/0157299 A1 | 7/2007 | Hare |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |
| 2007/0205266 A1 | 9/2007 | Carr et al. |
| 2007/0208669 A1 | 9/2007 | Rivette et al. |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |
| 2007/0299759 A1 | 12/2007 | Kelly |
| 2008/0010203 A1 | 1/2008 | Grant |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |
| 2008/0052182 A1 | 2/2008 | Marshall |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |
| 2008/0098222 A1 | 4/2008 | Zilberman |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0126233 A1 | 5/2008 | Hogan |
| 2008/0140576 A1 | 6/2008 | Lewis et al. |
| 2008/0147454 A1 | 6/2008 | Walker et al. |
| 2008/0154758 A1 | 6/2008 | Schattmaier et al. |
| 2008/0162202 A1 | 7/2008 | Khanna et al. |
| 2008/0162259 A1 | 7/2008 | Patil et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0217400 A1 | 9/2008 | Portano |
| 2008/0228635 A1 | 9/2008 | Megdal et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0281737 A1 | 11/2008 | Fajardo |
| 2008/0281743 A1 | 11/2008 | Pettit |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0319889 A1 | 12/2008 | Hammad |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0043637 A1 | 2/2009 | Eder |
| 2009/0044279 A1 | 2/2009 | Crawford et al. |
| 2009/0048957 A1 | 2/2009 | Celano |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106150 A1 | 4/2009 | Pelegero et al. |
| 2009/0106153 A1 | 4/2009 | Ezra |
| 2009/0106846 A1 | 4/2009 | Dupray et al. |
| 2009/0112650 A1 | 4/2009 | Iwane |
| 2009/0119106 A1 | 5/2009 | Rajakumar et al. |

(56) References Cited

U.S. PATENT DOCUMENTS

| | | |
|---|---|---|
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0126013 A1 | 5/2009 | Atwood et al. |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |
| 2009/0182653 A1 | 7/2009 | Zimiles |
| 2009/0199264 A1 | 8/2009 | Lang |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0216747 A1 | 8/2009 | Li et al. |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0234738 A1 | 9/2009 | Britton et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0024037 A1 | 1/2010 | Grzymala-Busse et al. |
| 2010/0030677 A1 | 2/2010 | Melik-Aslanian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094767 A1 | 4/2010 | Miltonberger |
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0188684 A1 | 7/2010 | Kumara |
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Ogrodski |
| 2010/0250509 A1 | 9/2010 | Andersen |
| 2010/0250955 A1 | 9/2010 | Trevithick et al. |
| 2010/0268557 A1 | 10/2010 | Faith et al. |
| 2010/0274679 A1 | 10/2010 | Hammad |
| 2010/0275265 A1 | 10/2010 | Fiske et al. |
| 2010/0280882 A1 | 11/2010 | Faith et al. |
| 2010/0293090 A1 | 11/2010 | Domenikos et al. |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040983 A1 | 2/2011 | Grzymala-Busse et al. |
| 2011/0047071 A1 | 2/2011 | Choudhuri et al. |
| 2011/0066547 A1 | 3/2011 | Clark et al. |
| 2011/0082768 A1 | 4/2011 | Eisen |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0131123 A1 | 6/2011 | Griffin et al. |
| 2011/0145899 A1 | 6/2011 | Cao et al. |
| 2011/0166988 A1 | 7/2011 | Coulter |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0030079 A1 | 2/2012 | Slater et al. |
| 2012/0030080 A1 | 2/2012 | Slater et al. |
| 2012/0030083 A1 | 2/2012 | Newman et al. |
| 2012/0030771 A1 | 2/2012 | Pierson et al. |
| 2012/0036352 A1 | 2/2012 | Tovar et al. |

(56) References Cited

U.S. PATENT DOCUMENTS

| | | |
|---|---|---|
| 2012/0066073 A1 | 3/2012 | Dilip et al. |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1 | 8/2012 | Patel et al. |
| 2012/0215682 A1 | 8/2012 | Lent et al. |
| 2012/0278227 A1 | 11/2012 | Kolo et al. |
| 2012/0278249 A1 | 11/2012 | Duggal et al. |
| 2012/0290660 A1 | 11/2012 | Rao et al. |
| 2013/0004033 A1 | 1/2013 | Trugenberger et al. |
| 2013/0132060 A1 | 5/2013 | Badhe et al. |
| 2013/0185293 A1 | 7/2013 | Boback |
| 2013/0218797 A1 | 8/2013 | Prichard et al. |
| 2014/0007238 A1 | 1/2014 | Magee et al. |
| 2014/0012716 A1 | 1/2014 | Bucholz |
| 2014/0058910 A1 | 2/2014 | Abeles |
| 2014/0149304 A1 | 5/2014 | Bucholz et al. |
| 2014/0214636 A1 | 7/2014 | Rajsky |
| 2014/0283097 A1 | 9/2014 | Allen et al. |
| 2014/0304822 A1 | 10/2014 | Sher-Jan et al. |
| 2015/0106260 A1 | 4/2015 | Andrews et al. |
| 2015/0142595 A1 | 5/2015 | Acuña-Rohter |
| 2015/0161529 A1 | 6/2015 | Kondaji et al. |
| 2015/0186901 A1 | 7/2015 | Miltonberger |
| 2015/0199784 A1 | 7/2015 | Straub et al. |
| 2015/0205692 A1 | 7/2015 | Seto |
| 2015/0295924 A1 | 10/2015 | Gottschalk, Jr. |
| 2015/0348036 A1 | 12/2015 | Nordyke et al. |
| 2015/0348208 A1 | 12/2015 | Nordyke et al. |
| 2016/0012561 A1 | 1/2016 | Lappenbusch et al. |
| 2016/0063278 A1 | 3/2016 | Kraska et al. |
| 2016/0063645 A1 | 3/2016 | Houseworth et al. |
| 2016/0071208 A1 | 3/2016 | Straub et al. |
| 2016/0086262 A1 | 3/2016 | Straub et al. |
| 2016/0142532 A1 | 5/2016 | Bostick |
| 2016/0210450 A1 | 7/2016 | Su |
| 2016/0328814 A1 | 11/2016 | Prichard et al. |
| 2016/0344758 A1 | 11/2016 | Cohen et al. |
| 2016/0379011 A1 | 12/2016 | Koike et al. |
| 2017/0053369 A1 | 2/2017 | Gottschalk, Jr. et al. |
| 2017/0099314 A1 | 4/2017 | Klatt et al. |
| 2017/0177683 A1 | 6/2017 | Koike et al. |
| 2017/0206376 A1 | 7/2017 | Sher-Jan |
| 2017/0270629 A1 | 9/2017 | Fitzgerald |
| 2017/0278182 A1 | 9/2017 | Kasower |
| 2017/0287065 A1 | 10/2017 | Samler et al. |
| 2017/0357971 A1 | 12/2017 | Pitz et al. |
| 2017/0374076 A1 | 12/2017 | Pierson et al. |
| 2018/0004978 A1 | 1/2018 | Hebert et al. |
| 2018/0013786 A1 | 1/2018 | Knopf |
| 2018/0033009 A1 | 2/2018 | Goldman et al. |
| 2018/0130157 A1 | 5/2018 | Gottschalk, Jr. et al. |
| 2018/0184288 A1 | 6/2018 | De Lorenzo et al. |
| 2018/0322572 A1 | 11/2018 | Straub et al. |
| 2019/0073676 A1 | 3/2019 | Wang |
| 2019/0164173 A1 | 5/2019 | Liu et al. |
| 2019/0228178 A1 | 7/2019 | Sharma et al. |
| 2019/0266609 A1 | 8/2019 | Phelan et al. |
| 2019/0294786 A1 | 9/2019 | Villavicencio et al. |
| 2019/0311366 A1 | 10/2019 | Zoldi et al. |
| 2019/0333101 A1 | 10/2019 | Sohum et al. |
| 2019/0349351 A1 | 11/2019 | Verma et al. |
| 2019/0377896 A1 | 12/2019 | Spinelli et al. |
| 2020/0134629 A1 | 4/2020 | Zoldi et al. |
| 2020/0143465 A1 | 5/2020 | Chilaka et al. |
| 2020/0145436 A1 | 5/2020 | Brown et al. |
| 2020/0151628 A1 | 5/2020 | Zoldi et al. |
| 2020/0193018 A1 | 6/2020 | Van Dyke |
| 2020/0242615 A1 | 7/2020 | Chandra et al. |
| 2020/0273097 A1 | 8/2020 | Nordyke et al. |
| 2020/0293684 A1 | 9/2020 | Harris et al. |
| 2020/0380112 A1 | 12/2020 | Allen |
| 2020/0396246 A1 | 12/2020 | Zoldi et al. |
| 2021/0021631 A1 | 1/2021 | Okutan et al. |
| 2021/0150532 A1 | 5/2021 | Zhang et al. |
| 2021/0209230 A1 | 7/2021 | Leitner et al. |
| 2021/0326785 A1 | 10/2021 | McBurnett et al. |
| 2021/0372314 A1 | 12/2021 | Weigl et al. |
| 2022/0038481 A1 | 2/2022 | Jones |
| 2022/0046088 A1 | 2/2022 | Knopf |
| 2022/0084032 A1 | 3/2022 | Koehler et al. |
| 2022/0103589 A1 | 3/2022 | Shen et al. |
| 2022/0123946 A1 | 4/2022 | Knopf |
| 2022/0147817 A1 | 5/2022 | Boardman et al. |
| 2022/0207324 A1 | 6/2022 | Hamilton et al. |
| 2022/0231859 A1 | 7/2022 | Knopf et al. |
| 2022/0277308 A1 | 9/2022 | Ardizzi et al. |
| 2022/0321394 A1 | 10/2022 | Huang et al. |
| 2022/0327541 A1 | 10/2022 | Seguritan |
| 2022/0358516 A1 | 11/2022 | Zoldi et al. |
| 2022/0368704 A1 | 11/2022 | Brown et al. |
| 2022/0377096 A1 | 11/2022 | Johnston et al. |
| 2022/0391793 A1 | 12/2022 | Latimer et al. |
| 2022/0400087 A1 | 12/2022 | Hoover et al. |
| 2022/0417275 A1 | 12/2022 | Jones |
| 2023/0035336 A1 | 2/2023 | Knopf |
| 2023/0046601 A1 | 2/2023 | Hamilton et al. |
| 2023/0082708 A1 | 3/2023 | Hoover et al. |
| 2023/0113118 A1 | 4/2023 | Guo et al. |
| 2023/0196147 A1 | 6/2023 | McBurnett et al. |
| 2023/0196455 A1 | 6/2023 | Huber et al. |
| 2023/0205893 A1 | 6/2023 | Gjorvad et al. |
| 2023/0216866 A1 | 7/2023 | Monnig et al. |
| 2023/0229767 A1 | 7/2023 | Galli et al. |
| 2023/0245246 A1 | 8/2023 | Stack et al. |

FOREIGN PATENT DOCUMENTS

| | | | |
|---|---|---|---|
| CN | 104877993 | | 9/2015 |
| CN | 113011973 | | 6/2021 |
| CN | 113011973 A | * | 6/2021 |
| DE | 91 08 341 | | 10/1991 |
| EP | 0 554 083 | | 8/1993 |
| EP | 2 939 361 | | 10/2019 |
| GB | 2 392 748 | | 3/2004 |
| GB | 2 518 099 | | 3/2015 |
| JP | 2011-134252 | | 7/2011 |
| JP | 5191376 | | 5/2013 |
| KR | 10-2004-0034063 | | 4/2004 |
| TW | I256569 | | 6/2006 |
| WO | WO 94/006103 | | 3/1994 |
| WO | WO 96/041488 | | 12/1996 |
| WO | WO 00/055778 | | 9/2000 |
| WO | WO 00/055789 | | 9/2000 |
| WO | WO 00/055790 | | 9/2000 |
| WO | WO 01/011522 | | 2/2001 |
| WO | WO 02/027610 | | 4/2002 |
| WO | WO 02/097563 | | 12/2002 |
| WO | WO 03/071388 | | 8/2003 |
| WO | WO 02/037219 A9 | | 5/2004 |
| WO | WO 2004/046882 | | 6/2004 |
| WO | WO 2006/069199 | | 6/2006 |
| WO | WO 2007/001394 | | 1/2007 |
| WO | WO 2007/106393 | | 9/2007 |
| WO | WO 2008/054403 | | 5/2008 |
| WO | WO 2008/054849 | | 5/2008 |
| WO | WO 2008/147918 | | 12/2008 |
| WO | WO 2009/062111 | | 5/2009 |
| WO | WO 2009/117518 | | 9/2009 |
| WO | WO 2011/044036 | | 4/2011 |
| WO | WO 2012/054646 | | 4/2012 |
| WO | WO 2012/112781 | | 8/2012 |
| WO | WO 2013/026343 | | 2/2013 |
| WO | WO 2013/126281 | | 8/2013 |
| WO | WO 2014/008079 | | 1/2014 |
| WO | WO 2014/008247 | | 1/2014 |
| WO | WO 2014/150987 | | 9/2014 |
| WO | WO 2015/184006 | | 12/2015 |
| WO | WO 2018/175440 | | 9/2018 |
| WO | WO 2018/208770 | | 11/2018 |
| WO | WO 2019/006272 | | 1/2019 |
| WO | WO 2019/040443 | | 2/2019 |
| WO | WO 2019/050864 | | 3/2019 |
| WO | WO 2019/079071 | | 4/2019 |

(56) References Cited

FOREIGN PATENT DOCUMENTS

| | | |
|---|---|---|
| WO | WO 2019/125445 | 6/2019 |
| WO | WO 2019/169000 | 9/2019 |
| WO | WO 2022/020162 | 1/2022 |
| WO | WO 2022/026273 | 2/2022 |
| WO | WO 2022/031412 | 2/2022 |
| WO | WO 2022/032285 | 2/2022 |
| WO | WO 2022/072989 | 4/2022 |
| WO | WO 2022/221202 | 10/2022 |
| WO | WO 2023/060150 | 4/2023 |
| WO | WO 2023/129977 | 7/2023 |

OTHER PUBLICATIONS

U.S. Appl. No. 14/928,770, U.S. Pat. No. 10,339,527, System and Architecture for Electronic Fraud Detection, filed Oct. 30, 2015.
U.S. Appl. No. 16/443,662, U.S. Pat. No. 10,990,979, System and Architecture for Electronic Fraud Detection, filed Jun. 17, 2019.
U.S. Appl. No. 17/208,327, U.S. Pat. No. 11,436,606, System and Architecture for Electronic Fraud Detection, filed Mar. 22, 2021.
U.S. Appl. No. 09/557,252, filed Apr. 24, 2000, Page.
U.S. Appl. No. 12/705,489, filed Feb. 12, 2010, Bargoli et al.
U.S. Appl. No. 12/705,511, filed Feb. 12, 2010, Bargoli et al.
"A New Approach to Fraud Solutions", BasePoint Science Solving Fraud, pp. 8, 2006.
Aad et al., "NRC Data Collection and the Privacy by Design Principles", IEEE, Nov. 2010, pp. 5.
Allard et al., "Safe Realization of the Generalization Privacy Mechanism", 2011 Ninth Annual International Conference on Privacy, Security and Trust, pp. 8.
"Arizona Company Has Found Key in Stopping ID Theft," PR Newswire, New York, Aug. 10, 2005 http://proquest.umi.com/pqdweb?did=880104711&SID=1&Fmt=3&clientId=19649&RQT=309&Vname=PQD.
ABC News Now:Money Matters, as broadcasted Nov. 15, 2005 with guest Todd Davis (CEO of Lifelock), pp. 6.
AlSalamah et al., "Security Risk Management in Online System", 2017 5th International Conference on Applied Computing and Information Technology/4th International Conference on Computational Science/Intelligence and Applied Informatics/2nd International Conference on Big Data, Cloud Computing, Data Science & Engineering, 2017, pp. 119-124.
Anonymous, "Feedback", Credit Management, ABI/Inform Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
Cowie, Norman, "Warning Bells & 'The Bust-Out'", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.

"Dealing with Measurement Noise (A Gentle Introduction to Noise Filtering)", Chemical and Process Engineering, University of Newcastle Upon Tyne, https://web.archive.org/web/20000418021742/http://lorien.ncl.ac.uk/ming/filter/filewma.htm, Archived Apr. 18, 2000, pp. 3.
EFunds Corporation, "Data & Decisioning: Debit Report" printed Apr. 1, 2007, http://www.efunds.com/web/industry-solutions/financial-services/frm-debit-report/htm in 1 page.
El Kalam et al., "Personal Data Anonymization for Security and Privacy in Collaborative Environments", 2005 IEEE, pp. 56-61.
Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.
Experian Team, "Impact on Credit Scores of Inquiries for an Auto Loan," Ask Experian, Mar. 1, 2009, pp. 5.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID=167100405, Aug. 2, 2005.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
"Fraud Alert | Learn How". Fight Identity Theft. http://www.fightidentitytheft.com/flag.html, accessed on Nov. 5, 2009.
Gaudio, David, "Intelligent Adaptive Authentication: How 6 Workflow Steps Improve Customer Experience", OneSpan, https://www.onespan.com/blog/intelligent-adaptive-authentication-how-6-workflow-steps-improve-customer-experience, Jun. 22, 2020, pp. 6.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Haglund, Christoffer, "Two-Factor Authentication with a Mobile Phone", Fox Technologies, Uppsala, Department of Information Technology, Nov. 2, 2007, pp. 62.
Herzberg, Amir, "Payments and Banking with Mobile Personal Devices," Communications of the ACM, May 2003, vol. 46, No. 5, pp. 53-58.
"ID Analytics ID Network", from www.idanalytics.com, as retrieved from www.archive.org, dated Nov. 20, 2005 or earlier; attached as "ID Network (IDN)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-numbre-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.

(56) References Cited

OTHER PUBLICATIONS

"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Jaeger, Herbert, "A Tutorial on Training Recurrent Neural Networks, Covering BPPT, RTRL, EKF and the 'Echo State Network' Approach", Fraunhofer Institute for Autonomous Intelligent Systems (AIS), International University Bremen, Oct. 2002, pp. 46.
Jin et al., "Network Security Risks in Online Banking", 2005 International Conference on Wireless Communications, Networking and Mobile Computing, Jan. 2005, vol. 2, pp. 1229-1234.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Lennox et al., "Tax Aggressiveness and Accounting Fraud", Journal of Accounting Research, 2013, pp. 40.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Quinn, Tom, "Low Credit Inquiries Affect Your Credit Score", Credit.com, May 2, 2011, pp. 2.
"Recurrent Neural Network", as downloaded from wikipedia.org <https://en.wikipedia.org/wiki/Recurrent_neural_network?oldid=717224329>, Apr. 2016, pp. 8.
Ribeiro et al., "Privacy Protection with Pseudonumization and Anonumization In a Health IoT System", Results from OCARIoT, 2019 IEEE, pp. 904-908.
Rivera, Barbara, "New Tools for Combating Income Tax Refund Fraud", https://gcn.com/Articles/2014/05/08/Insight-tax-fraud-tools.aspx?Page=1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
ShoeBoxed, https://www.shoeboxed.com/sbx-home/ printed Oct. 16, 2012 in 4 pages.
Singletary, Michelle, "The Littlest Victims of ID Theft", The Washington Post, The Color of Money, Oct. 4, 2007.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
"The Return Review: Program Increases Fraud Detection; However, Full Retirement of the Electronic Fraud Detection System Will be Delayed", Treasury Inspector General for Tax Administration, Sep. 25, 2017, Reference No. 2017-20-080, pp. 27.

(56) References Cited

OTHER PUBLICATIONS

TheMorningCall.Com, "Cheap Ways to Foil Identity Theft," www.mcall.com/business/columnists/all-karp.5920748jul01,0 . . . , published Jul. 1, 2007.
Torgler, Benno, "What Do We Know about Tax Fraud ?: An Overview of Recent Developments", Social Research: An International Quarterly, vol. 74, No. 4, Winter 2008, pp. 1239-1270.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
International Search Report and Written Opinion for Application No. PCT/US2007/06070, dated Nov. 10, 2008.
International Search Report and Written Opinion for Application No. PCT/US2008/064594, dated Oct. 30, 2008.
International Search Report and Written Opinion for Application No. PCT/US09/37565, dated May 12, 2009.
Official Communication in Australian Patent Application No. 2012217565, dated May 12, 2017.
Official Communication in Australian Patent Application No. 2017203586, dated Jun. 18, 2019.
Official Communication in Australian Patent Application No. 2019279982, dated Dec. 19, 2019.
Official Communication in Canadian Patent Application No. 2,827,478, dated Jun. 29, 2017.
Official Communication in Canadian Patent Application No. 2,827,478, dated May 31, 2018.
Official Communication in Canadian Patent Application No. 2,827,478, dated Mar. 27, 2019.
Extended European Search Report for Application No. EP12747205, dated Sep. 25, 2014.
Supplementary European Search Report for Application No. EP12747205, dated Jun. 19, 2015.
Extended European Search Report for Application No. EP18748000, dated Dec. 13, 2018.
International Search Report and Written Opinion for Application No. PCT/US2012/025456, dated May 21, 2012.
International Preliminary Report on Patentability in Application No. PCT/US2012/025456, dated Aug. 21, 2013.
International Search Report and Written Opinion for Application No. PCT/US2011/033940, dated Aug. 22, 2011.
Aïmeur et al., "The Scourge of Internet Personal Data Collection", 2013 International Conference on Availability, Reliability and Security, pp. 821-828.
Dimopoulou et al., "Mobile Anonymization and Pseudonymization of Structured Health Data for Research," 2022 Seventh International Conference on Mobile and Secure Services (MobiSecServ), 2022, pp. 1-6.
El Haddad et al., "Exploring User Behavior and Cybersecurity Knowledge—An Experimental Study in Online Shopping", 2018 16th Annual Conference on Privacy, Security and Trust (PST), pp. 10.
Hu et al. "Robust Support Vector Machines for Anomaly Detection in Computer Security", 2003, Proceedings of the 2003 International Conference on Machine Learning and Applications, pp. 7.
International Search Report and Written Opinion for Application No. PCT/US2022/024277, dated Jul. 18, 2022.
Kundu et al., "BLAST-SSAHA Hybridization for Credit Card Fraud Detection", Oct.-Dec. 2009, IEEE Transactions on Dependable and Secure Computing, vol. 6, No. 4, pp. 309-315.
Pervushin et al., "Determination of loss of information during data anonymization procedure," 2016 IEEE 10th International Conference on Application of Information and Communication Technologies (AICT), 2016, pp. 1-5.
Sun et al., "Enhancing Security Using Mobility-Based Anomaly Detection in Cellular Mobile Networks", Jul. 2006, IEEE Transactions on Vehicular Technology, vol. 55, No. 4, pp. 1385-1396.
Trivedi et al., "Parallel Data Stream Anonymization Methods: A Review," 2022 Second International Conference on Artificial Intelligence and Smart Energy (ICAIS), 2022, pp. 887-891.

* cited by examiner

SYSTEM AND ARCHITECTURE FOR ELECTRONIC FRAUD DETECTION

CROSS-REFERENCE TO RELATED APPLICATIONS

This application is a continuation of U.S. patent application Ser. No. 17/208,327 filed on Mar. 22, 2021, entitled SYSTEM AND ARCHITECTURE FOR ELECTRONIC FRAUD DETECTION, which is a continuation of U.S. patent application Ser. No. 16/443,662 filed on Jun. 17, 2019, entitled SYSTEM AND ARCHITECTURE FOR ELECTRONIC FRAUD DETECTION, which is a continuation of U.S. patent application Ser. No. 14/928,770 filed Oct. 30, 2015, entitled SYSTEM AND ARCHITECTURE FOR ELECTRONIC FRAUD DETECTION, which claims the benefit of priority from U.S. Provisional Patent Application No. 62/073,714 filed on Oct. 31, 2014, entitled SYSTEM AND ARCHITECTURE FOR ELECTRONIC FRAUD DETECTION. All above-cited applications are hereby incorporated herein by reference in their entirety.

BACKGROUND

Billions of dollars of fraudulent tax refunds are paid out every tax year. This not only puts a strain on government's ability to provide services, but it also erodes public trust in our country's tax system. With the increased reliance on electronic filing of tax returns comes an increase of the efficiency of tax operations and overall convenience. However, this has also contributed to a rise in identity theft and unwarranted or fraudulent tax refunds. Stealing identities and filing for tax refunds has become one of the fastest growing non-violent criminal activities in the country, often resulting in significant returns for the fraudster.

SUMMARY OF CERTAIN EMBODIMENTS

In one embodiment, an electronic fraud detection system is disclosed. The system may comprise: an electronic data interface module configured to electronically communicate with a first electronic data store configured to at least store tax return filing data associated with a plurality of consumers and at least one tax agency, wherein access to the first electronic data store is provided by a tax agency computing system, a second electronic data store configured to at least store consumer data associated with the plurality of consumers, and a third electronic data store configured to at least store consumer device activity data associated with a plurality of consumer devices associated with the plurality of consumers; an initial screening module configured to apply filters to tax return filing data, including at least one or more consumer attributes associated with each respective consumer and received from the electronic data interface module, to generate a set of electronic tax fraud indications that represent whether consumers records within the tax return filing data are likely fraudulent due to missing or inaccurate information; a knowledge-based authentication module configured to dynamically generate authentication questions associated with a consumer associated with one of the consumer records identified as likely fraudulent, the generated questions based on consumer credit data corresponding to the consumer that is received from the electronic data interface module, for which the answers are confidential and based on credit data, to provide the authentication questions, receive authentication response information corresponding to the authentication questions, and generate an electronic authentication indication representing an accuracy level of the authentication response information; a device authentication module configured to dynamically analyze whether a computing device used to provide the authentication response information may have been used in fraudulent activities or is related to other devices that have been used in fraudulent activities using a unique device identifier associated with the computing device, the unique device identifier generated using information collected from the computing device, and further configured to generate an electronic device indication representing a risk level that the device associated with fraud; and an accuracy reporting module configured to make the electronic authentication indication and the electronic device indication available to the tax agency computing system.

DETAILED DESCRIPTION OF VARIOUS EMBODIMENTS

Overview

Figure 1:
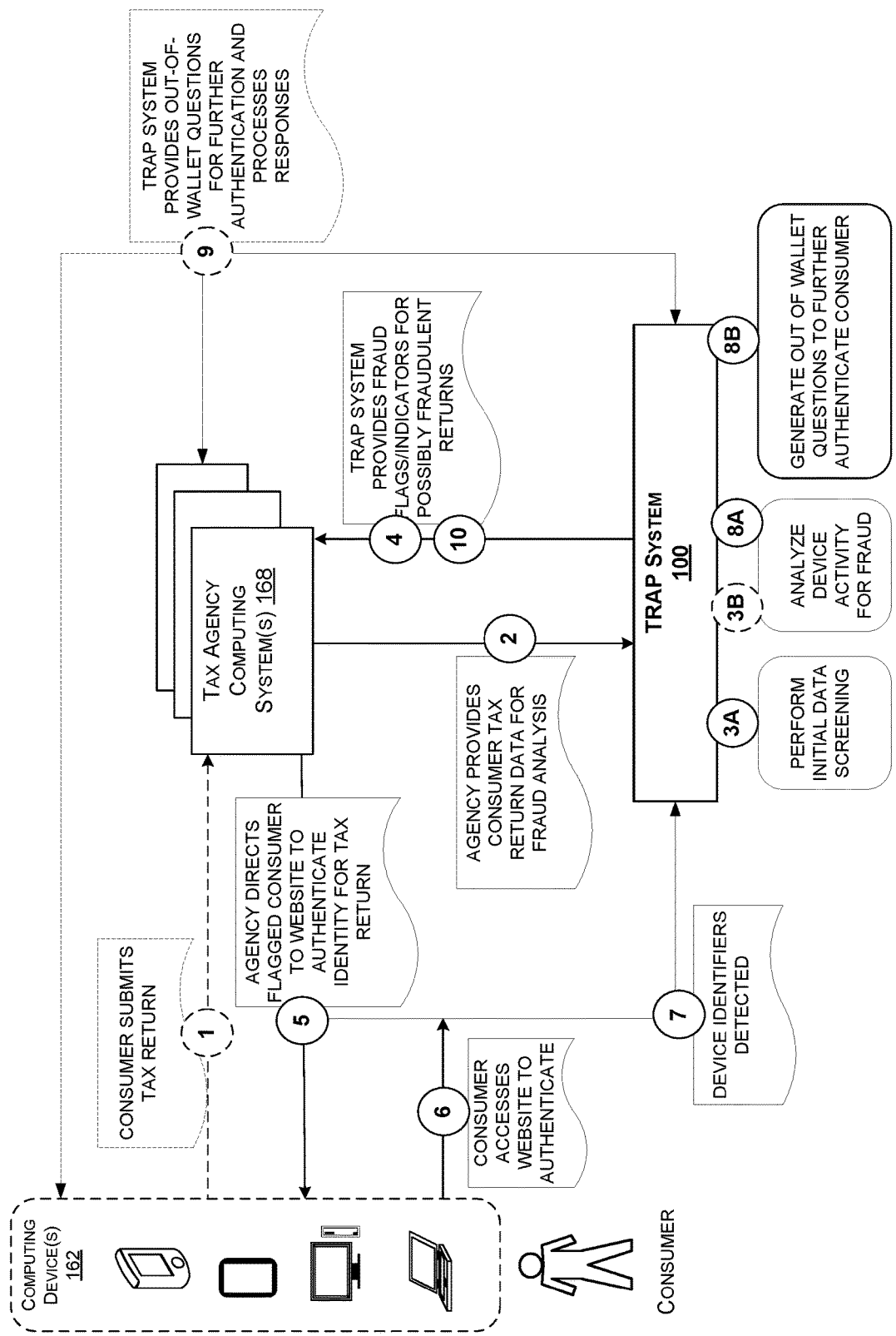
FIG. 1 is a block diagram which illustrates an exemplary data flow between a consumer device, tax agency computing system(s), and a tax return analysis platform system, according to one embodiment.

One principal method of conducting income tax refund fraud is through identity theft, specifically, by filing a tax return deceptively as someone else. According to a 2011 report by the Federal Trade Commission, identity theft has been the number one consumer complaint since 2000. Unfortunately, identities can be stolen from anywhere and resourceful identity thieves use a variety of ways to obtain an individual's personal information. Identity thieves can retrieve personal information by rummaging through the trash of businesses. In some cases identity thieves work for legitimate companies, medical offices, clinics, pharmacies, or government agencies, and take advantage of their roles at these organizations to illicitly obtain or solicit personal information.

Identity thieves have two primary concerns when they are concocting an income tax refund fraud scheme. They need to devise a clever system for moving and using the fraudulently obtained funds, and they need to figure out how to obtain another individual's social security number ("SSN") and other identifying information, which they will use to circumvent the existing tax return review process. Typically the fraudster will file a false return electronically, early in the tax filing season before the legitimate tax filer has a chance to the file their return. Fraudsters then use the stolen information and provide false information about wages earned, taxes withheld, and other data in order to appear as the legitimate tax payer who is entitled to a tax refund. The fraudster arranges for the proceeds of the refund to be deposited into a bank account or transferred to a debit card, or other similar methods which are virtually untraceable once the payment has been released. According to the IRS's Identity Protection Incident Tracking Statistics Report, incidents of identity theft tied to taxpayers has risen three fold from 2009 to 2011 growing from 456,453 incidents in 2009 to 1,125,634 in 2011.

Unfortunately, many individuals who are victims of identity theft may be unaware that their identity has been stolen to file fraudulent tax returns. It is not until the legitimate individual files a tax return resulting in a duplicate filing under the same name and SSN that many individuals realize they are a victim of identity theft. Everyone with a social security number is potentially vulnerable to having their identity stolen.

Anyone who has access to a computer can fill out an income tax form online and hit submit. Income tax returns are processed within days or weeks, and the proceeds are then deposited into accounts or provided on debit cards. Once released, these monies are virtually untraceable, and thus an improved method to detect fraudulent tax returns prior to releasing tax refund monies is needed. According to the Tax Inspector General for Tax Administration ("TIGTA"), the number of identified fraudulent tax returns has increased by 40% from 2011 to 2012 which equates to an increase in over $4B dollars. While the number of fraudulent tax returns can be identified, the full scope of the fraud remains unknown. Additionally in 2012, TIGTA reported that, using characteristics of identity theft confirmed by the IRS, it had identified approximately 1.5 million undetected tax returns with potentially fraudulent tax refunds totaling in excess of $5.2 billion. This number only takes into consideration income tax fraud on a federal level. TIGTA also found that contributing to the growth in tax fraud is an ongoing challenge in authenticating taxpayers. Even though some revenue agencies have adopted verification techniques such as use of a Personal Identification Number ("PIN"), or providing information from a previous year's return, these controls can be circumvented and have proven inadequate in stopping identity-based income tax fraud.

Income tax refund fraud schemes vary from those committed by individual perpetrators to those that are much more large scale, with multiple players spanning several years with the number of filings rising into the thousands and the losses ranging into the millions of dollars. With the average federal tax refund amounting to roughly $3,000 and state refund averaging around $500, many taxpayers anxiously await the return of their funds and are justifiably upset when their refunds are delayed. In some embodiments the systems used in detecting income tax refund fraud are effective and simultaneously efficient such that they do not delay the release of legitimate refunds. Complicating the issue is that typical "red flags" which might trigger a fraud alert, such as having a refund sent to a new address or an unfamiliar name, happen millions of times each year for honest reasons, such as when a taxpayer gets married (and changes his/her name and/or address) or moves, thus making it even more difficult to identify the fraudulent returns from the legitimate ones.

Embodiments of an electronic fraud analysis platform system are disclosed which may be used to analyze tax returns for potential fraud. Analysis of tax return data using the tax return analysis platform computing systems and methods discussed herein may provide insight into whether a tax return may be fraudulent based on, for example, an initial screening component configured to filter tax returns which appear fraudulent due to missing or inaccurate information provided with the return; a device activity analysis component configured to identify whether a device used to submit a tax return or to provide further authentication information needed to complete processing of the return may have been used in other fraudulent activities; and a knowledge-based authentication component configured to identify potential fraudsters using dynamically generated questions for which fraudsters typically do not know the answers.

The terms "individual," "consumer," "customer," "people," "persons," "party," "entity," and the like, whether singular or plural, should be interpreted to include either individuals or groups of individuals, such as, for example, married couples or domestic partners, joint tax filers, organizations, groups, business entities, non-profit entities, and other entities.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

For purposes of this disclosure, certain aspects, advantages, and novel features of various embodiments are described herein. It is to be understood that not necessarily all such advantages may be achieved in accordance with any particular embodiment of the invention. Thus, for example, those skilled in the art will recognize that one embodiment may be carried out in a manner that achieves one advantage or group of advantages as taught herein without necessarily achieving other advantages as may be taught or suggested herein.

High Level Data Flow

FIG. 1 is a block diagram which illustrates an exemplary data flow between a consumer computing device (or devices) (for example, a smart phone, a tablet, a car console, or other electronic computing device) 162, a tax agency computing system (or systems) 168, and a tax return analysis platform ("TRAP") system 100, according to one embodiment. The data flow of FIG. 1 illustrates at a high level how a consumer tax filing may be analyzed by the TRAP system according to associated processes described herein to determine and provide an indication of whether the tax filing may be fraudulent.

The exemplary data flow may begin at (1) when a consumer submits a tax return filing to a tax agency. The tax return may be submitted in any manner by which the tax agency accepts tax return filings, including traditional physical paper filings as well as electronic submissions. Traditional physical paper filings typically are digitally scanned or otherwise input to the tax agency computing system 168 to facilitate faster processing of the tax return.

In some instances, if a tax return is submitted to the tax agency electronically (for example, to the tax agency computing system 168), the tax agency may have the ability to detect or associate a user computing device used by the individual to submit the tax return. For example, in some cases an IP address, a device identifier, or other identifying information associated with the user computing device or the tax return may be automatically detected and gathered by the tax agency computing system, such as by the use of a client-side script downloaded to the user computing device, a cookie, or other methodology. Such device identifying information may be collected at various stages of an electronic tax return filing process, such as when the individual registers with the tax agency computing system 168 via a website provided by the tax agency, or when the individual submits the completed tax return to the tax agency, and so on. If device identifying information is gathered by the tax agency, the device identifying information may be provided to the TRAP system 100 and used or included in the tax refund fraud analysis processes described herein. Embodiments of various device identification systems and methods are disclosed in U.S. Pat. Nos. 7,853,533, 8,862,514, and U.S. Publication No. 2011/0082768, the entire contents of which are all hereby incorporated by reference herein. However, the TRAP system 100 may perform the tax refund fraud analysis processes even if such device identifying information is not provided by the tax agency at the outset.

Although the description with reference to (1) describes submission of a tax return for a single individual, the tax agency naturally receives tax returns numbering in the thousands or even millions depending on the size of the tax base being served. Thus it should be understood that the actions described at (1) may occur for thousands, millions, or any number of tax returns submitted to the tax agency, some in parallel and some over a period of time.

At (2), the tax agency provides tax return data for one or more consumers to be analyzed for potential fraud to the TRAP system 100. The TRAP system 100 is configured to support either analysis of a single tax return or analysis of multiple tax returns from multiple consumers via high-volume batch-mode processing. The TRAP system 100 may be configured to perform the fraud analysis in various ways and at different stages of the overall process flow as described further below.

Figure 6:
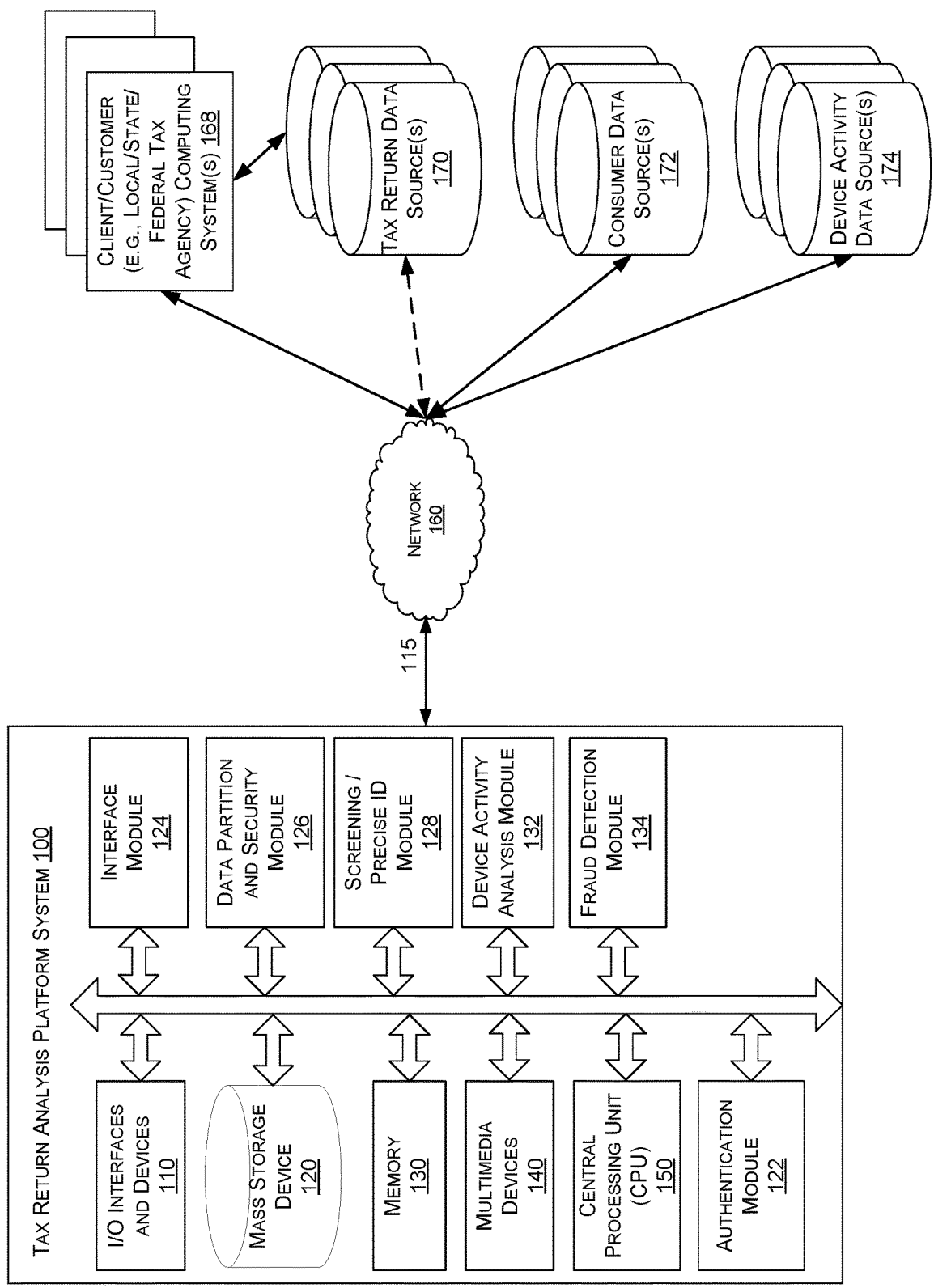
FIG. 6 is a block diagram showing one embodiment in which a tax return analysis platform computing system is in communication with a network and various systems, such as websites and/or online services, are also in communication with the network.

At (3A), the TRAP system 100 performs an automated, initial data screening of the tax return data to identify tax returns which may be potentially fraudulent. The initial screening may be performed, for example, by the screening/ precise ID module 128 of the TRAP system 100 as illustrated in FIG. 6. The automated initial screening process is described in more detail with reference to block 210 of FIG. 2 herein. At a high level, the initial screening process may involve accessing consumer data (such as consumer data that may be stored in one of the consumer data sources 172) that is generally known to be highly accurate and/or verified, generating consumer attributes (associated with each respective tax return provided by the tax agency), and performing matching, identification, verification, duplicate checking and other screening processes using the consumer attributes. A tax return may be flagged or identified as potentially fraudulent in response to determining, for example, that some consumer attributes associated with the tax return do not match the accessed consumer data.

If the tax agency provides device identifiers associated with the tax return data then at (3B) the TRAP system 100 may optionally perform a device activity analysis (which may also be referred to as device proofing) to further identify tax returns which may be potentially fraudulent. The device proofing process is described in more detail with reference to FIG. 4 herein. At a high level the device proofing process may involve accessing device activity data (such as device activity data that may be stored in one of the device activity data sources 174) using one or more of the provided device identifiers. The device activity data may indicate, for example, whether a particular device has been previously associated with other fraudulent activities. If a particular device associated with one or more of the device identifiers for a particular tax return has been previously associated with other fraudulent activities, the particular tax return may be flagged for potential fraud as well.

At (4), once the TRAP system 100 has completed the initial screen process (and optionally the device proofing process), the TRAP system 100 provides a list of flagged tax returns to the tax agency computing system 100. The list may be a one-to-one correspondence of the tax return data initially provided by the tax agency with only those particular tax returns identified by the TRAP system 100 as potentially fraudulent being flagged as such. In another embodiment, the list may include only those particular tax returns flagged by the TRAP system 100. In one embodiment, the flags may comprise one or more indicators, scores, probability, risk levels, or other information that may indicate a degree to which a respective tax return may be fraudulent. For example, a first tax return may be flagged as "low probability" and further indicate that only one consumer attribute with a low risk rate was found to be non-matching during the initial screening process. In another example, a second tax return may be flagged as "medium probability" and further indicate that several consumer attributes were found to be non-matching or unverified. In another example, a third tax return may be flagged as "high probability" and further indicate that several consumer attributes were found to be non-matching or unverified, as well as indicate that the device used to submit the tax return has been previously associated with other fraudulent activities.

In one embodiment, the tax agency can review and decide which returns to process, deny, or require additional information. For those where the tax agency wants more information which the tax agency can utilize the TRAP system 100 to conduct additional analysis. At (5), the tax agency computing system 168 may direct a flagged consumer to access a website or application provided by the tax agency in order to provide further authentication information necessary to complete processing of the tax return. For example, the tax agency computing system 168 may send a letter, an electronic message, or a text message to the flagged consumer based on the list provided by the TRAP system 100. In some instances the letter or electronic message may be sent automatically once the list is received from the TRAP system 100.

At (6), the consumer accesses the website or the application provided by the tax agency to provide the requested authentication information. The website may be preconfigured to download a script (for example, a JavaScript code or similar) to a computing device used by the consumer to access the website via a web browser, an application, or other program. The script may be provided by the TRAP system 100 to facilitate device proofing with respect to the computing device being used by the consumer to access the website.

At (7), device-related information, which may include one or more device attributes and/or identifiers, associated with the computing device used by the consumer to access the website or the application may be detected, for example by execution of the script or program of the application on the consumer's computing device. In one embodiment, the script or application may be configured to provide the device-related information to the tax agency computing system 100, which may be configured to perform internal processing and/or to forward the device-related information to the TRAP system 100. In another embodiment the script may be configured to provide the device-related information directly to the TRAP system 100. The device-related information may be used to generate a unique device identifier, which may be used, for example, as described herein to access device activity data associated with the unique device identifier. In some embodiments, generation of the unique device identifier may be performed by the TRAP system 100; by an application installed on the computing device used by the consumer (in which case the unique device identifier may be detected as part of the device-related information); or by a third party service that may offer device identity services via one or more application programmatic interfaces ("APIs").

At (8A), once the device identifiers are received by the TRAP system 100, the system may then perform the device proofing described above and in more detail with reference to FIG. 4 herein. The device proofing may be performed at (8A) to determine whether the computing device used by the consumer to provide the requested authentication information has previously been associated with any fraudulent activity. In some instances, the device proofing at (8A) may be the first time such device proofing is executed, such as would be the case in which the tax agency did not provide device identifiers to the TRAP system 100 with the tax return data at (2) discussed above. In such a scenario, the device proofing may only be applied with respect to the computing device used by the consumer at (6) to access the tax agency website.

However, in another possible scenario, the device proofing at (8A) may be at least the second time such device proofing is executed. For example, an initial device proofing may be performed at (3A) with respect to a first device used by a consumer to submit the tax return electronically to the tax agency computing system 168; and a second device proofing may be performed at (8A) with respect to a second device used by the same consumer at (6) to access the tax agency website. The first device and the second device may or may not be the same device, and as such the initial device proofing and the second device proofing may produce different results. For example, the initial device proofing may provide an indication that the first device is not associated with previous fraudulent activity, whereas the second device proofing may provide an indication that the second device is associated with previous fraudulent activity. This additional round of device proofing, if available, may provide the tax agency with an additional layer of fraud detection, as a fraudster may utilize multiple devices in an attempt to avoid detection.

At (8B), the TRAP system 100 may also initiate a knowledge-based authentication ("KBA") process in order to further authenticate the consumer and/or to provide further fraud detection back-end support to the tax agency computing system 100. For example, the consumer may be prompted to provide personal information (for example, full name, current and/or prior addresses, and other personally identifying information or "PII") through the tax agency website. Some or all this personal information may be gathered by the tax agency computing system 168, which may perform internal processing and/or forward the provided personal information to the TRAP system 100. In another embodiment, the personal information may be collected automatically and provided directly to the TRAP system 100, such as via a client-side script downloaded to the consumer's computing device when the tax agency website is accessed.

Once at least some personal information is received at the TRAP system 100, the TRAP system 100 can use the personal information to access consumer data, including credit data, associated with the consumer (for example, from the consumer data sources 172). The TRAP system 100 may then generate further authentication questions (for example, "out of wallet" questions) based on the accessed consumer data. For example, out of wallet questions may be generated in order to solicit responses that include information highly likely to only be known by the consumer (and/or unlikely to be known by a fraudster) which would not be found in the consumer's wallet, such as a monthly payment amount on an outstanding debt obligation which may appear in the consumer's credit data.

At (9), the TRAP system 100 provides the out-of-wallet or other authentication questions and receives and processes the responses. The questions may be provided directly to the consumer computing device, such as via a client side script downloaded to the consumer computing device when accessing the tax agency's authentication website. For example, a client side script may be provided by the TRAP system 100 to the tax agency computing system 168 for inclusion in the website. The client side script may be configured to retrieve personal information as it is entered by the consumer into a form on the website; send the personal information to the TRAP system 100; receive one or more authentication questions; and present the questions to the consumer for further authentication. The client side script may be further configured to collect responses to the presented questions and send the responses directly to the TRAP system 100. After the TRAP system 100 receives the responses, it processes them to determine whether they are accurate with respect to the accessed consumer data.

At (10), the TRAP system 100 provides one or more indicators of potential fraud (for example, scores and the like) to the tax agency computing system 168 based on any combination of the various fraud detection processes described throughout FIG. 1. For example, indicators may be provided for each of the initial screening, the first device proofing (if performed), the second device proofing, and the KBA process (including for example indicators of whether and/or how many questions were answered correctly). In one embodiment, a composite or aggregate tax return fraud score may be provided, wherein the fraud score may be generated based at least in part on any of the component fraud indicators described herein. The tax agency may then use the one or more indicators, and/or the aggregate tax return fraud score, to make a determination as to whether the tax return should be processed, denied, approved, or flagged for further follow-up.

Examples of Processes Performed by TRAP systems

FIGS. 2, 3, 4, and 5 are flowcharts illustrating various embodiments of TRAP system processes. In some implementations, the processes are performed by embodiments of the TRAP system 100 described with reference to FIG. 6 and/or by one of its components, such as the such as the authentication module 122, the data partition and security module 126, the screening/precise ID module 128, the device activity analysis module 132, and/or the fraud detection module 134. For ease of explanation, the following describes the services as performed by the TRAP system 100. The example scenarios are intended to illustrate, but not to limit, various aspects of the TRAP system 100. In one embodiment, the processes can be dynamic, with some procedures omitted and others added.

Initial Tax Fraud Screening

Figure 2:
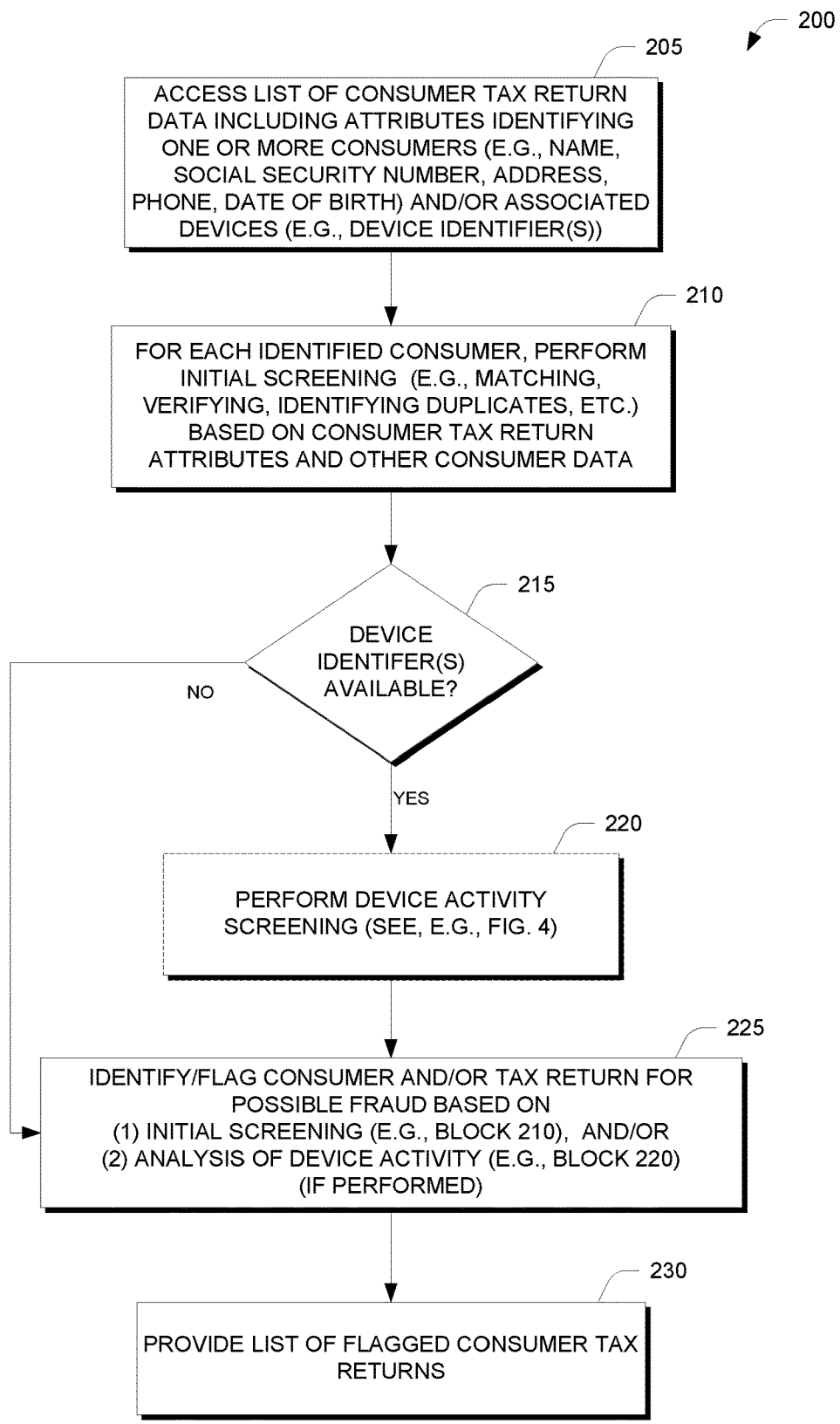
FIG. 2 schematically illustrates a logical flow diagram for one embodiment of an example process for performing an initial tax fraud screening of one or more tax returns which may be run by one embodiment of the tax return analysis platform computing system of FIG. 6.

FIG. 2 is a flowchart illustrating one embodiment of a process 200 for performing an initial tax fraud screening of one or more tax returns, which may be run by one embodiment of the TRAP system 100 of FIG. 6. The process 200 may be performed by the TRAP system 100 separately or in conjunction with, for example, the process 300 of FIG. 3, the process 400 of FIG. 4, and/or the process 500 of FIG. 5. For ease of explanation certain portions of the description below describes the process with respect to an individual consumer and an individual tax return. However the process may also be applied similarly to a plurality of consumers and/or a plurality of tax returns separately and/or in parallel, such as in batch processing of multiple thousands or millions of tax returns.

The process 200 begins at block 205, where the TRAP system 100 (for example, via the data partition and security module 126 of FIG. 6) accesses (or receives) a list of encrypted consumer tax return data. The tax return data may be provided by a tax agency to the TRAP system in order to perform an initial fraud screening of one or more consumer tax returns. In one embodiment the tax return data may be accessed from the tax return data source(s) 170 by the tax agency computing system 168 and provided to the TRAP system 100. In another embodiment, the TRAP system 100 may be granted permission to access the tax return data source 170 directly. As described with reference to FIG. 1 the tax return data may also include device identifiers that may be associated with respective tax returns.

At block 210, for each consumer identified in the tax return data, the TRAP system 100 (for example, via the screening/precise ID module 128) performs an initial screening (for example, data matching, data verification, identifying duplicates, and so forth) based on the attributes associated with each respective tax return. Various attributes may be screened including but not limited to name, address, date of birth, social security number ("SSN"), driver license, phone number (wireless or landline), bank account number(s), and/or IP address. Other attributes not expressly listed herein may also be used. To perform the initial screening, the TRAP system 100 may access consumer data from consumer data source(s) 172, wherein the consumer data may be accessed using at least some of the consumer attributes associated with respective tax returns. For example, one attribute of a tax return may include a social security number (or other unique consumer identifiers), which the TRAP system 100 may then use to access consumer data associated with the social security number (or other unique consumer identifiers). The screening process may generate, for example, a validation score which predicts the likelihood that the identification information supplied (for example, name, address, SSN, phone number, date-of-birth, and so forth) is a valid combination which has been seen previously within one or multiple data sources. The screening process may also generate, for example, an ID Theft Score that predicts the likelihood that the application is originating from the true consumer.

The screening process at block 210 may involve checking or addressing multiple attributes of each tax return, including for example: whether the SSN is valid; whether the name on the return matches the SSN provided; whether the tax filer exists in any data records at all; whether the address on the return matches the tax filer's current address; whether the SSN is associated with a deceased person; whether the address is valid or if it corresponds to an institution, a vacant lot, or some other invalid location; whether the return address on the tax return is in a state where the tax filer has never resided (for example, based on past address history which may be contained in the tax filer's credit data); whether there is any indication of fraud within the tax filer's credit data; whether multiple returns are identified as going to the same address; and/or whether joint filers as stated on the return are actually connected to each other (for example, spouses, domestic partners, and so forth)

Next, at block 215, the TRAP system 100 determines whether any device identifiers associated with respective tax returns with the tax return data have been provided and/or are available in order to facilitate an initial device proofing. In response to determining that device identifiers are provided or available the process 200 may proceed to block 220. In response to determining that no device identifiers are provided or available the process 200 may proceed to block 225.

At block 220, the TRAP system 100 (for example, via the device activity analysis module 132) may optionally perform an initial device activity screening (for example, device proofing) using any device identifiers associated with respective tax returns which have been provided to or accessed by the TRAP system 100. The device proofing process is described in more detail with reference to FIG. 4 herein. At a high level the device proofing process performed at block 220 may involve accessing device activity data (such as device activity data that may be stored in one of the device activity data sources 174, including as a lookup table which may further include blacklist information for one or more devices) using one or more of the device identifiers. The device activity data may indicate, for example, whether a particular device has been previously associated with other fraudulent activities or is associated with other devices which may have been involved in past fraud. If a particular device associated with one or more of the device identifiers for a particular tax return has been previously associated with other fraudulent activities, the particular tax return may be flagged for potential fraud as well.

Once the initial device activity screening at block 220 has been completed, or in response to determining that no device activity screening need be performed at this stage of the tax fraud analysis, the process 200 proceeds to block 225. At block 225, the TRAP system 100 (for example, via the fraud detection module 134) identifies or flags consumers and/or tax returns for possible fraud, based at least in part on the initial screening performed at block 210 and/or the device activity screening performed at block 220. The flags or indicators may include for example, a plurality of indicators for individually identified items from each of the items checked in the initial screening process at block 210 and/or the device activity screening performed at block 220; one or more indicators representing aggregate or overall fraud indicators for particular categories, such as an initial screening fraud score, a device fraud score; an overall fraud score; or any other variant or combination thereof.

At block 230, the TRAP system 100 provides the list of flagged consumer tax returns and possible fraud indicators.

This list may be provided, for example, to the particular tax agency which provided the tax return data for fraud analysis. The tax agency may then use the list of flagged tax returns in order to initiate further authentication of consumers who filed the flagged tax returns before completing the processing of those returns, and other purposes as described herein.

In one embodiment, the TRAP system 100 may store at least some identifying information related to flagged tax returns for possible retrieval and continued fraud analysis processes as will be described further below. Otherwise, the TRAP system 100 promptly and securely destroys or removes the tax return data once the process 200 has been completed in order to ensure privacy and maintain compliance with any regulatory requirements with respect to tax return data which may limit the purpose, use or duration under which such data may be held by non-tax agency entities.

Additional Tax Fraud Analysis

Figure 3:
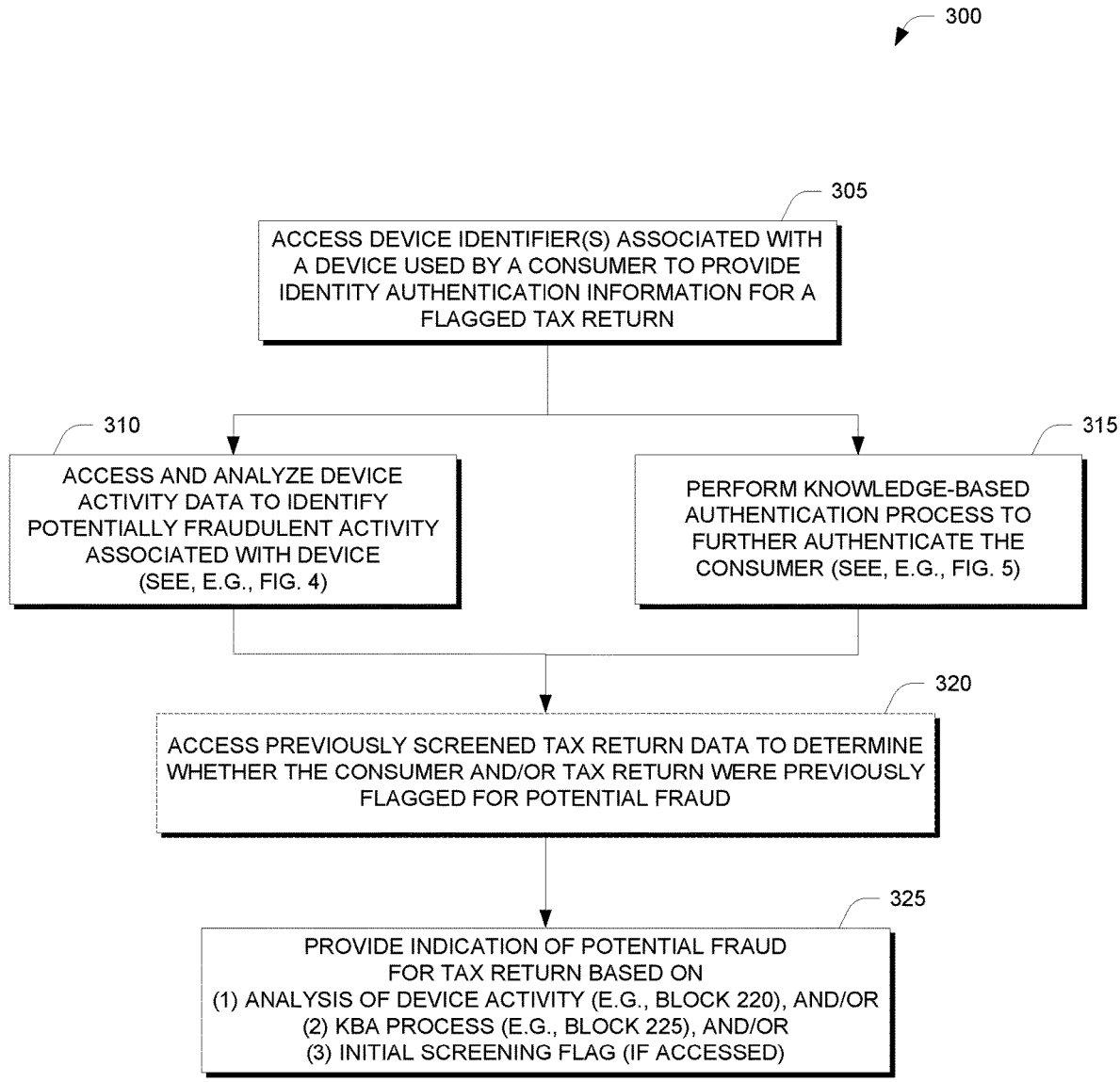
FIG. 3 schematically illustrates a logical flow diagram for one embodiment of another example process for performing a device activity analysis and/or a knowledge-based authentication process which may be run by one embodiment of the tax return analysis platform computing system of FIG. 6.

FIG. 3 is a flowchart illustrating one embodiment of a process 300 for performing a device activity analysis and/or a knowledge-based authentication process with respect to a consumer asked to provide further authentication information for a tax return flagged as potentially fraudulent, which may be run by one embodiment of the TRAP system of FIG. 6. The process 300 may be performed by TRAP system 100 separately or in conjunction with, for example, the processes 400 of FIG. 4 and/or the process 500 of FIG. 5.

At block 305, the TRAP system 100 (for example, via the device activity analysis module 132) accesses or receives the device identifiers associated with a device used by the consumer to provide identity authentication information for a flagged tax return. For example, in one embodiment, the process 300 may be performed in response to the consumer accessing a website (or using a software application or "app") provided by the tax agency to provide requested further authentication information in order to complete processing of a tax return filed by the consumer. The website or app may be configured to download a client-side script to the computing device used by the consumer to access the website or app, wherein the client-side script is configured to execute automatically in order to gather device identifiers associated with the consumer's computing device. These device identifiers may be collected and sent either to the tax agency computing system 168, which may in turn provide them to the TRAP system 100 for further fraud analysis; or the device identifiers may be provided directly to the TRAP system 100.

Next at block 310, the TRAP system 100 accesses and analyzes device activity data to identify potentially fraudulent activity that may be associated with the device used by the consumer to provide the requested identity authentication information. The device proofing process is described in more detail with reference to FIG. 4 herein.

At block 315, the TRAP system 100 (for example, the authentication module 122) performs or initiates a knowledge-based authentication ("KBA") process to further authenticate the consumer. The KBA process is described in more detail with reference to FIG. 5 herein.

In one embodiment, at least some identifying information usable to initially determine an identity of the consumer may be provided to the TRAP system 100. For example, some identifying information may be provided to the TRAP system 100 as follows: when the TRAP system performs the initial screening process described previously, a temporary encrypted identifier may be generated and associated with a flagged return and provided to the tax agency computing system 168. The tax agency computing system 168 may then include the temporary encrypted identifier along with the request to the consumer to access the website or app to provide further authentication information. The encrypted identifier may be provided, for example, as part of a unique access identifier the consumer may be prompted to enter at the website, or embedded in a unique URL or hyperlink the consumer may use to access the website. Once the consumer visits the website, the encrypted identifier may be detected and retrieved, for example as part of the client-side script configured to collect device identifier data, and eventually provided back to the TRAP system 100. The encrypted identifier may then be decrypted and used to determine, for example, either that the consumer is associated with a previously-flagged tax return or to obtain at least some initially identifying information such as a name or other non-sensitive data that may be used to initiate the KBA process.

In another embodiment, as the consumer provides personal information (for example, via the website or app), the personal information may be provided directly or indirectly (for example, via the tax agency computing system 168) to the TRAP system 100. When enough identifying information is received to at least initially determine an identity of the consumer, the TRAP system 100 may access verified consumer data associated with the determined identity, such as credit data, from the consumer data sources 172 in order to generate authentication questions.

At block 320, the TRAP system 100 may optionally access previously screened tax return data to determine whether the consumer and/or the tax return were previously flagged for potential fraud, and/or to what extent such potential fraud may be been previously determined. In some embodiments this data may not be available to the TRAP system 100 or available only in a limited fashion which protects the privacy and security of the underlying tax return data. One embodiment that may permit storage and retrieval of at least the fraud indicators generated by the TRAP system 100 during the initial screening process 200 may involve the use of encrypted identifiers as described above.

Finally, at block 325, the TRAP system 100 provides one or more indicators of the potential fraud for the flagged tax return, based at least in part on: the device activity analysis performed at block 310, the KBA process performed at block 315, and/or the initial screening flag accessed at block 320 (if applicable). For example, the provided indicators may include an indication of whether the computing device has been previously associated with other fraudulent activities; a degree or level of risk that may be associated with such other fraudulent activities; an indicator of whether and/or how many authentication questions were answered correctly by the consumer; an indicator of whether and/or to what extent the tax return may have previously been flagged for potential fraud during the initial screening described in reference to process 200; an overall fraud score, range, number, letter, and so forth that may be generated in the aggregate or for each individually flagged item; and so forth.

Device Activity Analysis

Figure 4:
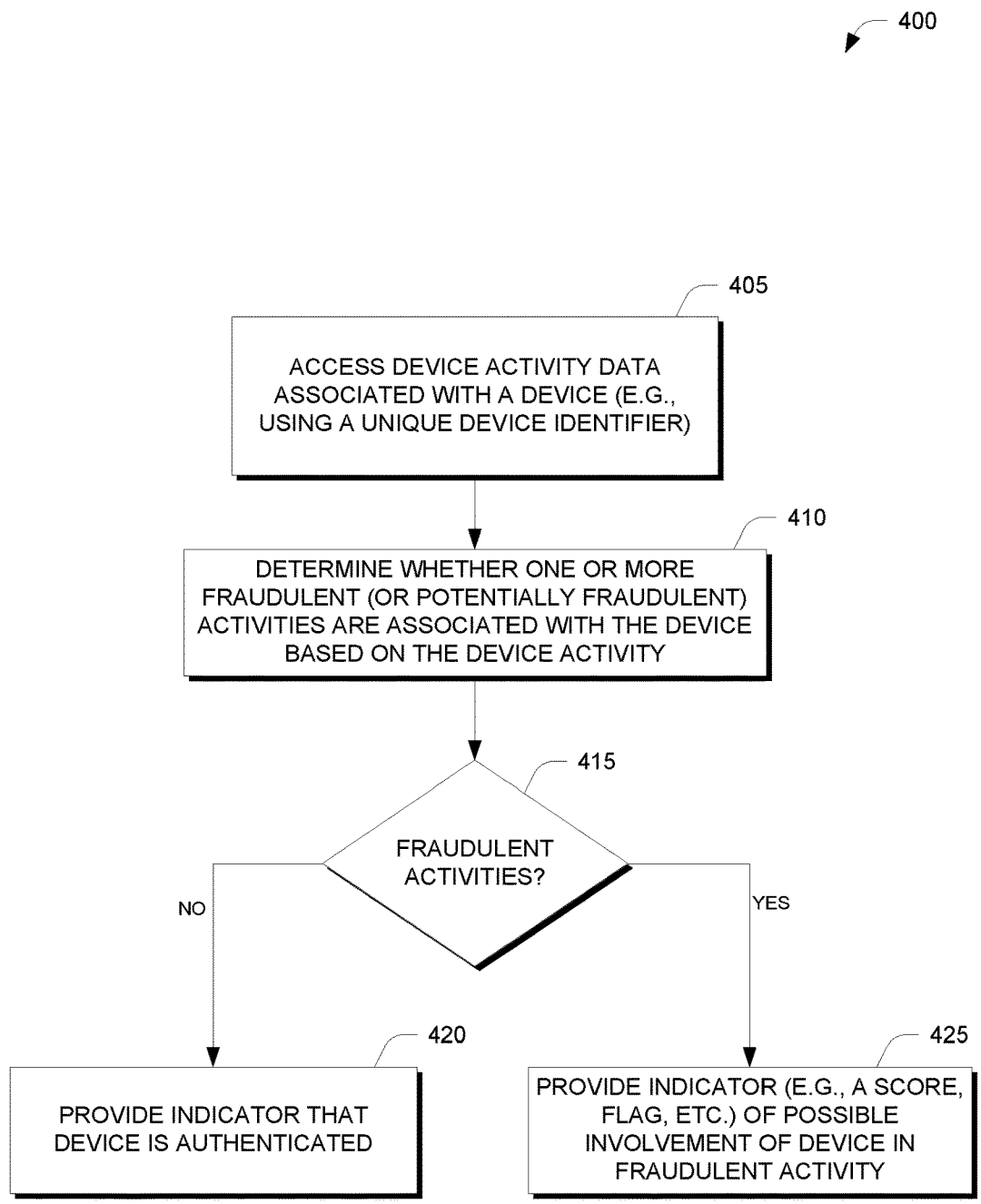
FIG. 4 schematically illustrates a logical flow diagram for one embodiment of a process for performing a device activity analysis which may be run by one embodiment of the tax return analysis platform computing system of FIG. 6.

FIG. 4 is a flowchart illustrating one embodiment of a process 400 for performing a device activity analysis which may be run by one embodiment of the TRAP system of FIG. 6. The process 400 may be performed by TRAP system 100 separately or in conjunction with, for example, the process 300 of FIG. 3.

The process 400 begins at block 405, where the TRAP system 100 (for example, via the device activity analysis module 132) accesses device activity data associated with a device, for example using a unique device identifier. The unique device identifier may be generated or determined, for example, based on the one or more device identifiers accessed at block 305 of FIG. 3. The unique device identifier may be one of the accessed device identifiers, or it may be based on some combination of some or all of the accessed device identifiers.

At block 410, the TRAP system 100 determines whether one or more fraudulent or potentially fraudulent activities are associated with the device based on the accessed device activity. The device activity analysis process performed at block 410 may involve accessing device activity data (such as device activity data that may be stored in one of the device activity data sources 174) using one or more of the device identifiers. The device activity data may indicate, for example, whether a particular device has been previously associated with other fraudulent activities or whether a device is in a blacklist. If a particular device associated with one or more of the device identifiers has been previously associated with other fraudulent activities, the particular device may be flagged for potential fraud as well.

Next, at block 415, the TRAP system 100 determines whether any fraudulent activities are associated with the device. In response to determining that no fraudulent activities appear to be associated with the device the process 400 may proceed to block 420. In response to determining that fraudulent activities are associated with the device the process 400 may proceed to block 425.

At block 420, the TRAP system 100 provides an indicator that the device is authenticated or otherwise does not appear to be associated with prior fraudulent activities.

At block 425, the TRAP system 100 provides at least one indicator (for example, a score, a flag, or other indicator) to describe the possible involvement of the device in the fraudulent activities. In one embodiment, the TRAP system 100 may also provide or enable access to a dashboard user interface that allows users to fully research and link seemingly unrelated events. The capability provided by the dashboard user interface can have a multiplying effect on the ability to detect fraud because, for example, the residue left by fraudsters across different transactions or accounts can be linked together for more precise detection of fraud rings.

Knowledge-Based Authentication Process

Figure 5:
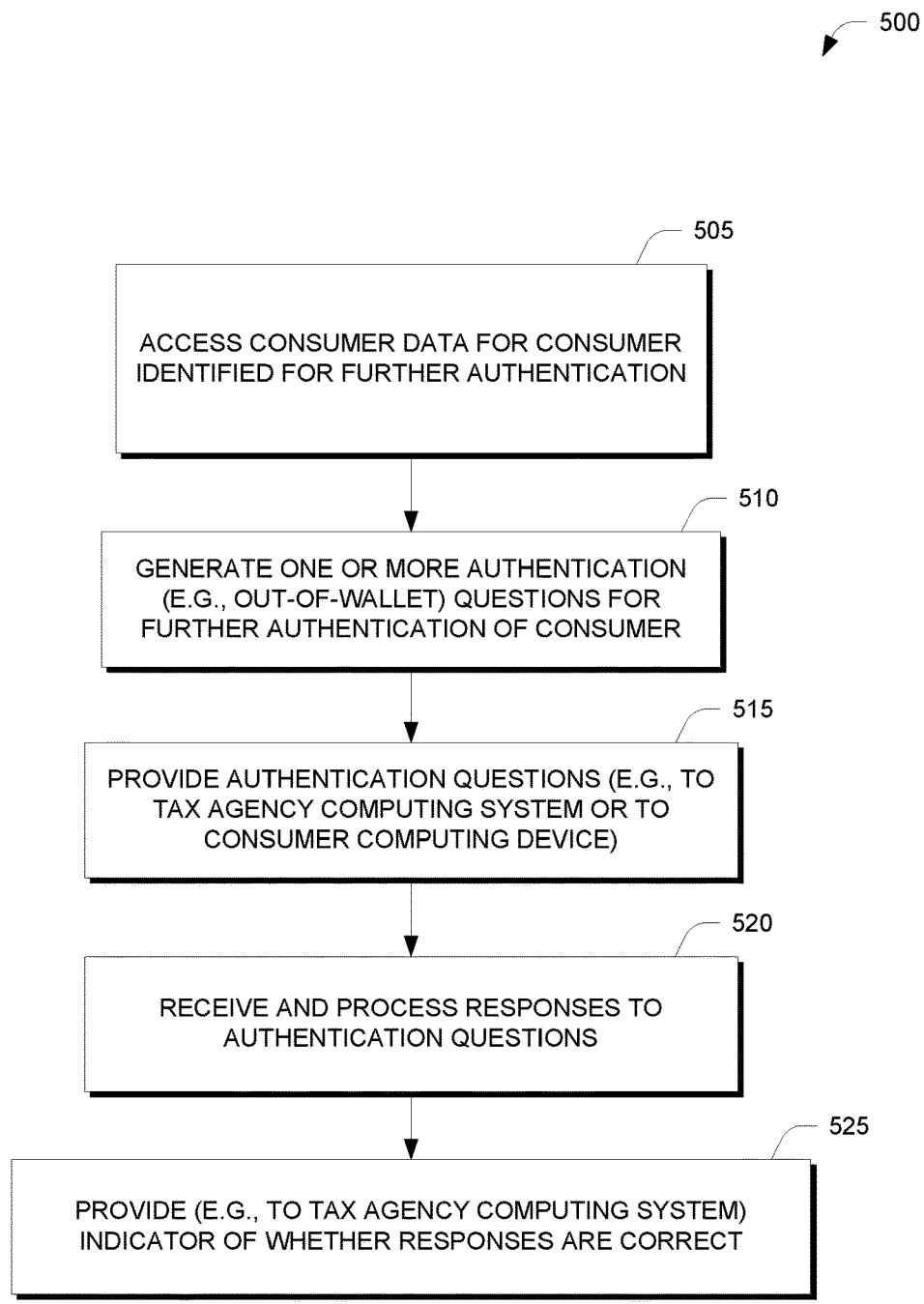
FIG. 5 schematically illustrates a logical flow diagram for one embodiment of an example knowledge-based authentication process which may be run by one embodiment of the tax return analysis platform computing system of FIG. 6.

FIG. 5 is a flowchart illustrating one embodiment of a process 500 for performing a knowledge-based authentication process which may be run by one embodiment of the TRAP system of FIG. 6. The process 500 may be performed by TRAP system 100 separately or in conjunction with, for example, the process 300 of FIG. 3.

The process 500 begins at block 505, where the TRAP system 100 (for example, via the authentication module 122) access consumer data, such as credit data or a credit report, associated with the consumer (for example, from the consumer data sources 172).

At block 510, the TRAP system 100 generates one or more authentication questions (for example, "out of wallet" questions) based on the accessed consumer data in order to further authenticate the user. For example, out of wallet questions may be generated in order to solicit responses that include information highly likely to only be known by the consumer (and/or unlikely to be known by a fraudster), such as a monthly payment amount on an outstanding debt obligation which may appear on the consumer's credit report, the name or address of a particular loan servicer, the date that the last payment was posted to a credit account, and so on.

Next, at block 515, the TRAP system 100 provides the out-of-wallet or other authentication questions. The questions may be provided by the TRAP system 100 directly to the consumer computing device, such as via a client side script downloaded to the consumer computing device when accessing the tax agency's authentication website. For example, a client side script may be provided by the TRAP system 100 to the tax agency computing system 168 for inclusion in the website. The client side script may be configured to retrieve personal information as it is entered by the consumer into a form on the website; send the personal information to the TRAP system 100; receive one or more authentication questions from the TRAP system 100; and present the questions to the consumer for further authentication. The client side script may be further configured to collect responses to the presented questions and send the responses directly to the TRAP system 100.

At block 520, the TRAP system 100 receives/processes responses to the authentication questions. The responses are processed to determine whether they are accurate with respect to the accessed consumer data.

At block 525, the TRAP system 100 provides an indicator of whether and/or how many responses were correct. This information may be provided to the tax agency computing system 168 which can then use the information to determine whether the tax return should be denied, approved, or flagged for further follow-up.

Example System Implementation and Architecture

FIG. 6 is a block diagram of one embodiment of a tax return analysis platform ("TRAP") system 100 in communication with a network 160 and various systems, such as consumer computing device(s) 162, tax agency computing systems(s) 168, tax return data source(s) 170, consumer data source(s) 172, and device activity data source(s) 174. The TRAP system 100 may be used to implement systems and methods described herein, including but not limited to the processes 200, 300, and 400 of FIGS. 2, 3, 4, and 5 respectively.

TRAP System

In the embodiment of FIG. 6, the TRAP system 100 includes an authentication module 122, an interface module 124, a data partition and security module 126, a screening/precise ID module 128, a device activity analysis module 132, and a fraud detection module 134 that may be stored in the mass storage device 120 as executable software codes that are executed by the CPU 150. These and other modules in the TRAP system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 6, the TRAP system 100 is configured to execute the modules recited above to perform the various methods and/or processes for tax filing data analysis as described herein (such as the processes described with respect to FIGS. 2, 3, 4, and 5 herein).

The authentication module 122 provides capabilities related to the knowledge-based authentication processes described, for example, with reference to FIGS. 3 and 5 herein. For example, the authentication module 122 may be configured to access the consumer data sources 172; generate authentication questions to be presented to a consumer asked to provide further authentication information for a tax return flagged as potentially fraudulent; receive and process responses; and provide indications of the accuracy of responses.

The interface module 124 provides capabilities related to interfacing between the TRAP system 100, the tax agency computing systems 168, and various data sources 170 (if applicable), 172, and 174. For example, the interface module 124 may be configured to provide various client-side scripts to the tax agency which may in turn be installed as part of a web service provided by the tax agency for consumers to access in order to further authenticate for a tax return. The interface module 124 may further be configured to receive data via the client-side scripts or from the tax agency computing systems for further processing by the various other modules described herein.

The data partition and security module 126 provides capabilities related to ensuring that tax return data accessed or received from various tax agency systems 168 and/or tax return data sources 170 are strictly separated or partitioned to maintain data privacy for each respective tax agency. In some embodiments the data partition and security module 126 may also be configured to ensure that the tax return data is promptly and securely destroyed or removed from the memory 130 and/or mass storage 120 of TRAP system 100 once the tax return data fraud analysis process(es) have completed.

The screening/precise ID module 128 provides capabilities related to performing identity screening and related routines, for example on tax returns provided by tax agency computing systems to the TRAP system 100 for fraud analysis. Some of these processes are described, with reference to FIG. 2 herein and may include, for example, matching and/or verifying consumer attributes associated with a tax return against verified consumer data accessed from the consumer data sources 172; identifying discrepancies in consumer attributes which may signal potential fraud, such as the use of a prior address rather than a current address; and similar types of screening.

The device activity analysis module 132 provides capabilities related to performing "device proofing" to determine whether a device used by a consumer during any part of the tax return process (for example, either filing/submitting the tax return or providing further information that may be required by the tax agency in order to complete processing of the tax return, and so on). Some of these processes are described, with reference to FIGS. 3 and 4 herein and may include, for example, accessing device activity data from the device activity data sources 174; determining whether fraudulent activities may be associated with the device; and providing indicators for the tax agency computing system regarding the likelihood that the device used by the consumer may have been previously used for other fraudulent activities.

The fraud detection module 134 provides capabilities related to those described with respect to the authentication module 122, the screening/precise ID module 128, and/or the device activity/analysis module 132. For example, the fraud detection module 134 may receive outputs from these various other modules and use the output to generate fraud indicator information (for example, a plurality of indicators for individually identified items from each of the modules involved in the fraud analysis process; one or more indicators representing aggregate or overall fraud indicators for particular categories, such as an initial screening fraud score, a device fraud score, and/or a KBA fraud score; an overall fraud score; or any other variant or combination thereof).

The TRAP system 100 includes, for example, a server, workstation, or other computing device. In one embodiment, the exemplary TRAP system 100 includes one or more central processing units ("CPU") 150, which may each include a conventional or proprietary microprocessor. The TRAP system 100 further includes one or more memories 130, such as random access memory ("RAM") for temporary storage of information, one or more read only memories ("ROM") for permanent storage of information, and one or more mass storage device 120, such as a hard drive, diskette, solid state drive, or optical media storage device. Typically, the modules of the TRAP system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of TRAP system 100 may be combined into fewer components and modules or further separated into additional components and modules.

The TRAP system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the TRAP system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary TRAP system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia analytics, for example. The TRAP system 100 may also include one or more multimedia devices 140, such as speakers, video cards, graphics accelerators, and microphones, for example.

Network

In the embodiment of FIG. 6, the I/O devices and interfaces 110 provide a communication interface to various external devices. In the embodiment of FIG. 6, the TRAP system 100 is electronically coupled to a network 160, which comprises one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 6, in some embodiments information may be provided to or accessed by the TRAP system 100 over the network 160 from one or more tax return data sources 170, consumer data source(s) 172, and/or device activity data source(s) 174. The tax return data source(s) 170, consumer data source(s) 172, and/or device activity data source(s) 174 may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

Tax Return Data Sources

The tax return data source(s) 170 may store, for example, tax return data including attributes, profiles, and other data descriptive of or related to tax return filings. The tax return data may include name, address, social security number, financial data related to the return, and other such information typically provided in a local or state tax return filing. In some embodiments, due to the sensitive nature of such tax return data, the TRAP system 100 may not have direct access to the tax return data source(s) 170. Rather, the tax agency computing system(s) 168 would have access to their own respective tax return data sources 170 and provide selected tax return data to the TRAP system 100. In some embodiments the TRAP system 100 may have at least a limited access permission (as indicated by the dashed line connecting network 160 to the tax return data sources 170) which may be allowed by the tax agency or under various laws and regulatory requirements which limit access to such data by non-tax agency or non-government entities.

Consumer Data Sources

The consumer data source(s) 172 may store, for example, credit bureau data (for example, credit bureau data from File Ones<sup>SM</sup>) and/or other consumer data. Consumer data source(s) 172 may also store geographic level demographics that include one or more models, such as models that identify lifestyle and/or socio-economic attributes associated with a geographic location (for example, MOSAIC® segmentation and/or codes) and/or behavioral/attitudinal/psychographic attributes associated with a geographic location (for example, TrueTouch<sup>SM</sup> Touch Points segmentation).

Device Activity Data Sources

The device activity data source(s) 174 may store, for example, device activity data for respective computing devices. The device activity data may include among other things indications of fraudulent activities that may be associated with particular device identifiers. For example, a fraudster may use a device to engage in a fraudulent transaction online, and thus the transaction and a device identifier associated with the device may be collected and stored in a device activity data source 174. Such information may be extremely valuable to prevent future repeat fraud with the same device, such as if a potential tax fraudster attempts to use the device in relation to filing of a fraudulent tax return.

Additional Use Cases

In some embodiments, the systems and methods maybe used to provide a variety of features, such as the features described below.

Risk Based Versus Traditional Rules Based Tax Return Analysis

One aspect of the identity authentication or screening processes described herein is that the processes may be based upon data and analytics used in the financial industry to approve millions of credit transactions daily. In some instances authentication tools may be certified under Federal Identity, Credential and Access Management ("FICAM") at a National Institute of Standards and Technology ("NIST") Level of Assurance ("LOA") 3 for virtual identity authentication. Such authentication tools help organizations to mitigate risk in billions of dollars in credit transactions, the majority of which are done electronically and in virtual anonymity. One strength of these authentication tools is the ability to not only use traditional identity verification checks based upon public records review, but the addition of a risk based process providing an identity fraud score which significantly lowers the number of false positives. The most predictive authentication and fraud scores are those that incorporate multiple data assets spanning traditionally used customer information categories, such as public records and demographic data, but also utilize, when possible, credit history attributes and historical application and inquiry records. Scores that incorporate a breadth of varied data categories such as credit attributes and demographic data typically outperform models built on singular categories of data such as public record assets.

Knowledge-Based Authentication

In addition, to verify a tax filer's identity, further authentication of those returns that are identified or flagged as suspect or potentially fraudulent may be implemented to provide greater assurance that the tax refund is released to the legitimate taxpayer. In conjunction with a risk-based identity proofing process, the tax refund fraud detection process can be further strengthened by use of a knowledge based authentication ("KBA") process, which often include "Out of Wallet" questions. The tax filer is required to answer a list of questions correctly in order to receive the requested refund. In certain embodiments, challenge-response question technology can be used to dynamically formulate questions only the true tax payer would know. With an adjustable question configuration and the ability to change strategies for each inquiry, tax agencies may be well-suited to achieve their identity verification or fraud prevention and detection objectives with various levels of authentication. Configurable time limits can prevent fraudsters from researching answers during faceless interactions, and the use of both credit and non-credit related questions provide a more accurate picture of the consumer and further assure that the refund is being released to the legitimate taxpayer. The KBA processes described herein may be provided, for example, via a web site or app.

Device Identity Proofing

Many tax filings are now conducted electronically, which further preserves anonymity for the fraudster and allows for a quicker turn around in receiving the fraudulent refund. Individuals committing tax fraud will typically use the same computer to submit tax returns, submit credit applications, open accounts, and so forth. Device proofing capabilities offered by embodiments of the systems and methods described herein can authenticate the device being used to provide additional assurance that the device is not currently involved in or tied to other fraudulent activity, nor has it been involved in or tied to any past fraudulent activity.

Fraud Detection in Other Financial Transactions

A stolen identity has a short shelf life, and fraudsters frequently will try to utilize it for multiple transactions before it is abandoned. Thus, in some embodiments, an inquiry process that utilizes a complex set of algorithms may determine if the attributes of the identity used in the tax return have been involved in other fraudulent attempts to open accounts or secure lines of credit. This independent inquiry check based on the same identity credentials being used to submit the fraudulent tax return can help identify if the fraudster has attempted to use these same credentials in other credit related activities.

Returns Linked to Multiple Bank Accounts and Addresses

One of the weaknesses in the tax filing system which is exploited by income tax fraudsters is the government's need to quickly process returns and provide refunds. Tax returns are frequently processed and refunds released within a few days or weeks. This quick turnaround may not allow the government to fully authenticate all the elements submitted on returns. Current fraud detection processes does not detect addresses or bank accounts that are receiving multiple refunds. Most income tax refund fraudsters want easy access to their fraudulent refunds and thereby chose to have the refund placed on a debit card and sent to one or two of the same addresses or deposited into one or two accounts. Having large numbers of debit card sent to the same address or refunds deposited into one account is not normal behavior for legitimate tax filers, and thus evidence of such behavior can also be used as a fraudulent flag indicator in the return analysis process.

Thus, in one embodiment, the TRAP system 100 may be configured to analyze tax return filings to, for example, determine whether a same address is used multiple times across multiple tax returns. The TRAP system 100 also may be configured to analyze tax return filings to, for example, determine whether a same bank account is used multiple times across multiple tax returns. In another embodiment, the TRAP system 100 may be configured to combine both of these features to determine whether a same address is used in conjunction with a same bank account across multiple tax returns. Any one of these determinations, alone or in combination, may contribute or give rise to a fraudulent flag indicator. In another embodiment, as another fraud safeguard the TRAP system 100 may be configured to access verified bank account data (for example, under permission from a participating bank service provider), or be configured to request verification of a bank account with respect to the individual tax filer. Thus, for example, if one or more tax returns appear potentially fraudulent based on repeated use of a same address or a same bank account, the TRAP system 100 may be configured to perform an additional bank account verification process to verify whether the tax filer(s) associated with the suspect return(s) are verified account holders with respect to the bank accounts used on the suspected return(s).

Income Check Against Reported Adjusted Gross Income ("AGI")

As described above, the income tax refund fraudster can use a variety of methods to obtain a consumer's name, address, and Social Security Number. However, it is not as easy for a fraudster to obtain information on an individual's income. According to TIGTA, access to third-party income and withholding information at the time tax returns are processed can be an important tool in identifying and preventing tax refund fraud. Unfortunately, this information is usually not available until well after tax filing season begins, since employers are not required to file W-2 information until after the consumer filing process begins. The amounts listed on fraudulent returns can thus be falsified by the fraudster in order to increase the ultimate number of deductions and extract the largest refund without arousing suspicion. In some instances, using income estimation models, the reported income can be checked against third party data not based upon previous years' returns, but, independent financial information which can take into account a consumer's credit history and recent spending habits. While not a report of the actual income, it can provide a gauge that can be used to flag returns where reported income is well outside the expected norm for that tax filer.

The use of a risk based identity authentication process, coupled with business rules based analysis and knowledge based authentication tools can facilitate identification of fraudulent tax returns. In addition, the ability to perform non-traditional checks against device fraud activity; the use by fraudsters of same identity credentials in independent financial transactions; detecting that multiple refunds are requested to be to sent to the same address or deposited into the same bank account; and the ability check the reported income against an individual consumer's estimated income, further strengthens the tax refund fraud detection processes and helps close additional loopholes exploited by the tax fraudster while at the same time decreasing the number of false positives. Embodiments of the tax return analysis platform system and methods described herein may be easy to implement, integrate seamlessly into any existing tax return evaluation process, and/or add little to no additional time to the existing process, thereby assuring a continued quick turnaround for legitimate tax refund releases, while at the same time providing increased assurance that the refunds are being provided to the legitimate tax payer.

OTHER EMBODIMENTS

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the TRAP system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by the TRAP system 100 and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A system comprising:
a network interface configured to send and receive secure, encrypted electronic messages with a remote tax agency server, the remote tax agency server comprising a first electronic data store configured to store a plurality of tax return data associated with a plurality of consumers and at least one tax agency;
a second electronic data store comprising device activity data records associated with the plurality of consumers; and
a computing device configured to electronically communicate with the remote tax agency server and the second electronic data store, the computing device comprising one or more processors programmed to execute software instructions to cause the system to:
  access, from the remote tax agency server, a first tax return data associated with a first tax return associated with a first consumer of the plurality of consumers, the first tax return data comprising one or more consumer attributes associated with the first consumer;
  identify the first tax return as a flagged tax return based at least in part on the one or more consumer attributes associated with the first consumer;
  access, from the second electronic data store, a first device activity data associated with a consumer computing device associated with the first consumer, the first device activity data indicative of at least one of: whether the consumer computing device has been previously associated with fraudulent activities, a degree of risk associated with the fraudulent activities, or whether the consumer computing device is in a list of devices that are banned from conducting a tax return filing;

analyze the first device activity data; and based at least in part on the analysis of the first device activity data, generate a fraud score for the first tax return data and request authentication of the consumer computing device associated with the first consumer.

2. The system of claim 1, wherein the software instructions further cause the system to:

access, from a third electronic data store, a first consumer data associated with the first consumer;

determine one or more consumer attributes from the first consumer data;

compare the one or more consumer attributes from the first consumer data with the one or more consumer attributes associated with the first tax return; and determine whether the one or more consumer attributes from the first consumer data match with the one or more consumer attributes associated with the first tax return.

3. The system of claim 1, wherein the authentication of the consumer computing device associated with the first consumer comprises:

generating a set of one or more authentication questions;

transmitting, to the consumer computing device, the set of one or more authentication questions;

receiving, from the consumer computing device, a set of one or more responses to the set of one or more authentication questions; and determine, based on the set of one or more responses, whether the set of one or more responses are correct.

4. The system of claim 1, wherein the consumer computing device associated with the first consumer is the same as or different from a device used to electronically submit the first tax return of the first consumer.

5. The system of claim 1, wherein the first tax return data further comprises one or more device identifiers associated with a device used to electronically submit the first tax return, and wherein a first tax fraud indicator is generated based in part on the one or more device identifiers of the first tax return data.

6. The system of claim 1, wherein the first device activity data associated with the first consumer is accessed from the second electronic data store based at least in part on a unique device identifier associated with the consumer computing device associated with the first consumer.

7. The system of claim 6, wherein the software instructions further cause the system to:

send a request to the consumer computing device, the request comprising a link configured to automatically gather device identification information when assessed;

receive device identification information associated with the consumer computing device from the consumer computing device; and determine the unique device identifier associated with the consumer computing device based at least in part on the device identification information.

8. A computer-implemented method performed by one or more computer processors comprising:

accessing, via a server system, a first tax return data from a remote tax agency server via a network interface, the network interface configured to send and receive secure, encrypted electronic messages with the remote tax agency server, the remote tax agency server comprising a first electronic data store configured to store a plurality of tax return data associated with a plurality of consumers and at least one tax agency, the first tax return data associated with a first tax return associated with a first consumer of the plurality of consumers and comprising one or more consumer attributes associated with the first consumer;

identifying, via a server system, the first tax return as a flagged tax return based at least in part on the one or more consumer attributes associated with the first consumer;

accessing, via a server system, a first device activity data from a second electronic data store, the first device activity data associated with a consumer computing device associated with the first consumer, the first device activity data indicative of at least one of: whether the consumer computing device has been previously associated with fraudulent activities, a degree of risk associated with the fraudulent activities, or whether the consumer computing device is in a list of devices that are banned from conducting a tax return filing;

analyzing, via a server system, the first device activity data; and based at least in part on the analysis of the first device activity data, generating, via a server system, a fraud score for the first tax return data and generating an electronic authentication instruction to launch an authentication execution script to conduct authentication of the consumer computing device associated with the first consumer.

9. The computer-implemented method of claim 8 further comprising:

accessing, from a third data store, a first consumer data associated with the first consumer;

determining one or more consumer attributes from the first consumer data;

comparing the one or more consumer attributes from the first consumer data with the one or more consumer attributes associated with the first tax return; and determining whether the one or more consumer attributes from the first consumer data match with the one or more consumer attributes associated with the first tax return.

10. The computer-implemented method of claim 8, wherein the requesting authentication of the consumer computing device associated with the first consumer comprises:

generating a set of one or more authentication questions;

transmitting, to the consumer computing device, the set of one or more authentication questions;

receiving, from the consumer computing device, a set of one or more responses to the set of one or more authentication questions; and determining, based on the set of one or more responses, whether the set of one or more responses are correct.

11. The computer-implemented method of claim 8, wherein the authentication of the consumer computing device is based at least in part on personal information associated with the first consumer.

12. The computer-implemented method of claim 8, wherein the first tax return data further comprises one or more device identifiers associated with a device used to electronically submit the first tax return, and wherein a first tax fraud indicator is generated based in part on the one or more device identifiers of the first tax return data.

13. The computer-implemented method of claim 8, wherein the first device activity data associated with the first consumer is accessed from the second electronic data store based at least in part on a unique device identifier associated with the consumer computing device associated with the first consumer.

14. The computer-implemented method of claim 13, further comprising:
- sending a request to the consumer computing device, the request comprising a link configured to automatically gather device identification information when assessed;
- receiving device identification information associated with the consumer computing device from the consumer computing device; and
- determining the unique device identifier associated with the consumer computing device based at least in part on the device identification information.

15. A non-transitory computer storage having stored thereon a computer program, the computer program including executable instructions that instruct a computer system to at least:
- access a first tax return data from a remote tax agency server via a network interface, the network interface configured to send and receive secure, encrypted electronic messages with the remote tax agency server, the remote tax agency server comprising a first electronic data store configured to store a plurality of tax return data associated with a plurality of consumers and at least one tax agency, the first tax return data associated with a first tax return associated with a first consumer of the plurality of consumers and comprising one or more consumer attributes associated with the first consumer;
- identify the first tax return as a flagged tax return based at least in part on the one or more consumer attributes associated with the first consumer;
- access a first device activity data from a second electronic data store, the first device activity data associated with a consumer computing device associated with the first consumer, the first device activity data indicative of at least one of: whether the consumer computing device has been previously associated with fraudulent activities, a degree of risk associated with the fraudulent activities, or whether the consumer computing device is in a list of devices that are banned from conducting a tax return filing;
- analyze the first device activity data; and
- based at least in part on the analysis of the first device activity data, generate a fraud score for the first tax return data and request authentication of the consumer computing device associated with the first consumer.

16. The non-transitory computer storage of claim 15, wherein the executable instructions further instruct the computer system to:
- access, from a third data store, a first consumer data associated with the first consumer;
- determine one or more consumer attributes from the first consumer data;
- compare the one or more consumer attributes from the first consumer data with the one or more consumer attributes associated with the first tax return; and
- determine whether the one or more consumer attributes from the first consumer data match with the one or more consumer attributes associated with the first tax return.

17. The non-transitory computer storage of claim 15, wherein the requesting authentication of the consumer computing device associated with the first consumer comprises:
- generating a set of one or more authentication questions;
- transmitting, to the consumer computing device, the set of one or more authentication questions;
- receiving, from the consumer computing device, a set of one or more responses to the set of one or more authentication questions; and
- determining, based on the set of one or more responses, whether the set of one or more responses are correct.

18. The non-transitory computer storage of claim 15, wherein the first tax return data further comprises one or more device identifiers associated with a device used to electronically submit the first tax return, and wherein a first tax fraud indicator is generated based in part on the one or more device identifiers of the first tax return data.

19. The non-transitory computer storage of claim 15, wherein the first device activity data associated with the first consumer is accessed from the second electronic data store based at least in part on a unique device identifier associated with the consumer computing device associated with the first consumer.

20. The non-transitory computer storage of claim 19, wherein the executable instructions further instruct the computer system to:
- send a request to the consumer computing device, the request comprising a link configured to automatically gather device identification information when assessed;
- receive device identification information associated with the consumer computing device from the consumer computing device; and
- determine the unique device identifier associated with the consumer computing device based at least in part on the device identification information.

* * * * *